(12) United States Patent
Rosenblatt et al.

(10) Patent No.: US 9,215,304 B2
(45) Date of Patent: Dec. 15, 2015

(54) DATA STORE AND ENHANCED FEATURES FOR HEADSET OF PORTABLE MEDIA DEVICE

(75) Inventors: Michael N. Rosenblatt, Campbell, CA (US); Andrew M. Van Court, Los Gatos, CA (US); Jeffrey D. Mullen, Pittsburgh, PA (US)

(73) Assignee: Apple Inc., Cupertino, CA (US)

( * ) Notice: Subject to any disclaimer, the term of this patent is extended or adjusted under 35 U.S.C. 154(b) by 1078 days.

(21) Appl. No.: 12/231,575

(22) Filed: Sep. 3, 2008

(65) Prior Publication Data

US 2009/0182913 A1 Jul. 16, 2009

(51) Int. Cl.
*G06F 13/12* (2006.01)
*G06F 12/02* (2006.01)
*H04M 1/60* (2006.01)
*H04M 1/05* (2006.01)
*H04M 1/725* (2006.01)

(52) U.S. Cl.
CPC .............. *H04M 1/6058* (2013.01); *H04M 1/05* (2013.01); *H04M 1/72527* (2013.01); *H04M 1/72558* (2013.01)

(58) Field of Classification Search
USPC ................................ 381/74, 384; 455/575.2
See application file for complete search history.

(56) References Cited

U.S. PATENT DOCUMENTS

| | | | |
|---|---|---|---|
| 3,648,249 A | 3/1972 | Goldsberry | |
| 3,746,991 A | 7/1973 | Gautney | |
| 4,338,846 A | 7/1982 | Pogoda | |
| 4,998,091 A | 3/1991 | Rezmer | |
| 5,345,510 A | 9/1994 | Singhi et al. | |
| 5,388,496 A | 2/1995 | Miller et al. | |
| RE35,536 E | 6/1997 | Irissou et al. | |
| 5,640,458 A * | 6/1997 | Nishiguchi et al. | 381/74 |
| 6,251,077 B1 | 6/2001 | Mo et al. | |
| 6,426,697 B1 | 7/2002 | Capowski et al. | |
| 6,745,014 B1 | 6/2004 | Seibert et al. | |
| 6,859,538 B1 * | 2/2005 | Voltz | 381/77 |
| 6,988,905 B2 | 1/2006 | Corey et al. | |
| 6,999,584 B1 * | 2/2006 | Bogard | 379/428.01 |
| 7,088,575 B2 * | 8/2006 | Chiu et al. | 361/679.31 |
| 7,110,799 B1 | 9/2006 | Willins et al. | |
| 7,283,635 B1 * | 10/2007 | Anderson et al. | 381/74 |
| 7,349,546 B2 | 3/2008 | Ganton | |
| 2001/0053228 A1 * | 12/2001 | Jones | 381/71.6 |

(Continued)

FOREIGN PATENT DOCUMENTS

EP 1976246 A1 1/2008
WO 9957937 A1 11/1999

(Continued)

OTHER PUBLICATIONS

"TRS Connector" Wikipedia, [online], retrieved May 19, 2010, http://en.wikipedia.org/wiki/TRS_connector, pp. 1-13.

*Primary Examiner* — Duc Nguyen
*Assistant Examiner* — Phan Le
(74) *Attorney, Agent, or Firm* — Downey Brand LLP

(57) ABSTRACT

A media headset for exchanging data with a media device includes at least one audio speaker that provides an audio output, a data store that stores media device data, a communications interface for exchanging the media device data with the media device, and a connector for detachably connecting the communications interface to the media device.

29 Claims, 11 Drawing Sheets

(56) References Cited

U.S. PATENT DOCUMENTS

| | | | |
|---|---|---|---|
| 2002/0032047 A1 | 3/2002 | Ingbir | |
| 2005/0128097 A1 | 6/2005 | Piccolo, III et al. | |
| 2005/0190306 A1 | 9/2005 | Lee | |
| 2005/0201568 A1 | 9/2005 | Goyal | |
| 2005/0249360 A1 | 11/2005 | Adcock et al. | |
| 2006/0009868 A1 | 1/2006 | Park | |
| 2006/0156353 A1* | 7/2006 | Dorner | 725/86 |
| 2006/0223581 A1 | 10/2006 | Jacobs et al. | |
| 2007/0004472 A1 | 1/2007 | Gitzinger | |
| 2007/0147630 A1* | 6/2007 | Chiloyan | 381/74 |
| 2007/0178947 A1* | 8/2007 | Kim | 455/575.2 |
| 2007/0225049 A1 | 9/2007 | Andrada | |
| 2007/0281744 A1* | 12/2007 | Andreasson | 455/557 |
| 2008/0032753 A1 | 2/2008 | Nho | |
| 2008/0039072 A1 | 2/2008 | Bloebaum | |
| 2008/0065911 A1* | 3/2008 | Elazar et al. | 713/194 |
| 2008/0112567 A1* | 5/2008 | Siegel et al. | 381/58 |
| 2008/0140868 A1* | 6/2008 | Kalayjian et al. | 710/8 |
| 2008/0164994 A1 | 7/2008 | Johnson et al. | |
| 2008/0242378 A1* | 10/2008 | Lowles et al. | 455/575.2 |
| 2008/0309313 A1 | 12/2008 | Farrar et al. | |
| 2009/0122510 A1 | 5/2009 | Stiehl et al. | |
| 2009/0179768 A1 | 7/2009 | Sander et al. | |
| 2009/0179789 A1 | 7/2009 | Haughay, Jr. et al. | |
| 2009/0180353 A1 | 7/2009 | Sander et al. | |
| 2009/0180354 A1 | 7/2009 | Sander et al. | |
| 2009/0180629 A1 | 7/2009 | Sander et al. | |
| 2009/0180630 A1 | 7/2009 | Sander et al. | |
| 2009/0180642 A1 | 7/2009 | Sander et al. | |
| 2009/0180643 A1 | 7/2009 | Sander et al. | |
| 2009/0180659 A1 | 7/2009 | Sander et al. | |
| 2010/0042781 A1* | 2/2010 | Reuss | 711/115 |
| 2010/0054493 A1 | 3/2010 | Lin et al. | |

FOREIGN PATENT DOCUMENTS

| | | |
|---|---|---|
| WO | 03056790 A1 | 7/2003 |
| WO | 2008085929 A1 | 7/2008 |
| WO | 2009091660 A1 | 7/2009 |

* cited by examiner

DATA STORE AND ENHANCED FEATURES FOR HEADSET OF PORTABLE MEDIA DEVICE

REFERENCE TO RELATED APPLICATIONS

This application is related to U.S. patent application Ser. No. 12/203,876 (now U.S. Pat. No. 7,869,608), filed on Sep. 3, 2008, entitled "Electronic Device Accessory." The entire contents of the above-referenced applications are incorporated herein by reference.

BACKGROUND

This invention relates to storing and transferring data using a headset capable of interfacing with a media device.

Traditional media devices, e.g., mobile telephones, include a communications jack for accessories. One such traditional accessory is a headset that has one or two speakers and a microphone. A user can conduct a telephone call using such an accessory. More particularly, a user can receive audio data associated with a telephone call through the two speakers and send audio data associated with the telephone call through the microphone. Other media devices, e.g., an MP3 player, typically connect with a headset to enable a user to listen to music. Many types of media devices are portable and have compact form factors to enable efficient handling and use by a user.

One problem with using existing media devices is that a user, when using a particular media device at least for the first time, must configure the media device to support the user's needs or preferences. For example, a user may prefer certain equalizer settings when listening to music. If the user uses multiple media devices, or decides to use a friend's media device, the user must configure the currently-used media device with their preferred equalizer settings. Accordingly, there is a need to enable a media device to be efficiently configured with a user's preferred media device settings.

Another problem with existing media devices is that data transfer techniques from one media device to another media device can be inefficient or impractical. For example, due to their small form factor, certain types of media devices may not have the ability to support traditional personal computer (PC) connectors or interfaces such as a standard universal serial bus (USB) connector. Also, it can be inefficient for a user to transfer a song from a first media device to a second media device using an intermediary PC or remote server. Accordingly, there is a need for enabling a media device user to efficiently transfer data from one media device to another media device. There is also a need, in certain circumstances, to ensure that the data transfer adheres to certain digital rights rules or requirements.

SUMMARY

The invention, in various embodiments, addresses deficiencies in the prior art by providing systems, methods and devices that enable the efficient transfer of media device data, e.g., user preference data, and other data to and/or from a media device using an enhanced headset capable of receiving, storing, and transferring such data.

In one aspect, a media headset includes at least one audio speaker that provides an audio output, a data store that stores media device data, a communications interface that exchanges the media device data with a media device, and a connector that detachably connects the communications interface to the media device.

In one configuration, the headset includes a controller that controls the exchange of media device data. In another configuration, the headset includes first and second audio speakers where each speaker is associated with an ear of a user. The headset may include a microphone that receives an audio input.

Media device data may include media data and/or media device configuration data. Media device configuration data may include preference settings for a media device. The preference settings may include user-specific configuration settings, user interface settings, video display settings, keypad mapping settings, configuration settings for a media device software application, alert settings for a media device, communications settings, authentication information, access control information, encryption/decryption information, and/or digital rights management information. Media data may include music, a song, a video, an image, multimedia, a game, an audio file, an audio recording, video file, video recording, a contact list, a software application, personal information, business information, v-card information, medical information, financial information, voice memos, biometric data, metadata, any type of electronic data, and/or any type of digital media.

In one configuration, the data store includes a flash memory. The headset may include at least one control interface for receiving a user input. The communications interface may include a communications channel made up of at least one data cable.

In another aspect, a media device includes a communications interface that sends media data to a headset for storage in a memory of the headset and/or receives media data from the headset where the media data has been stored in the memory of the headset. The headset may include at least one audio speaker. Also, the media device may include a connector that detachably connects the communications interface to the headset.

In one configuration, the headset includes a communications channel having at least one data cable. The data cable may include a cable connector capable of being detachably connected to the connector of a media device. The cable connector may include a plug while the connector of the media device includes a jack.

BRIEF DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

DESCRIPTION OF THE INVENTION

Figure 1:
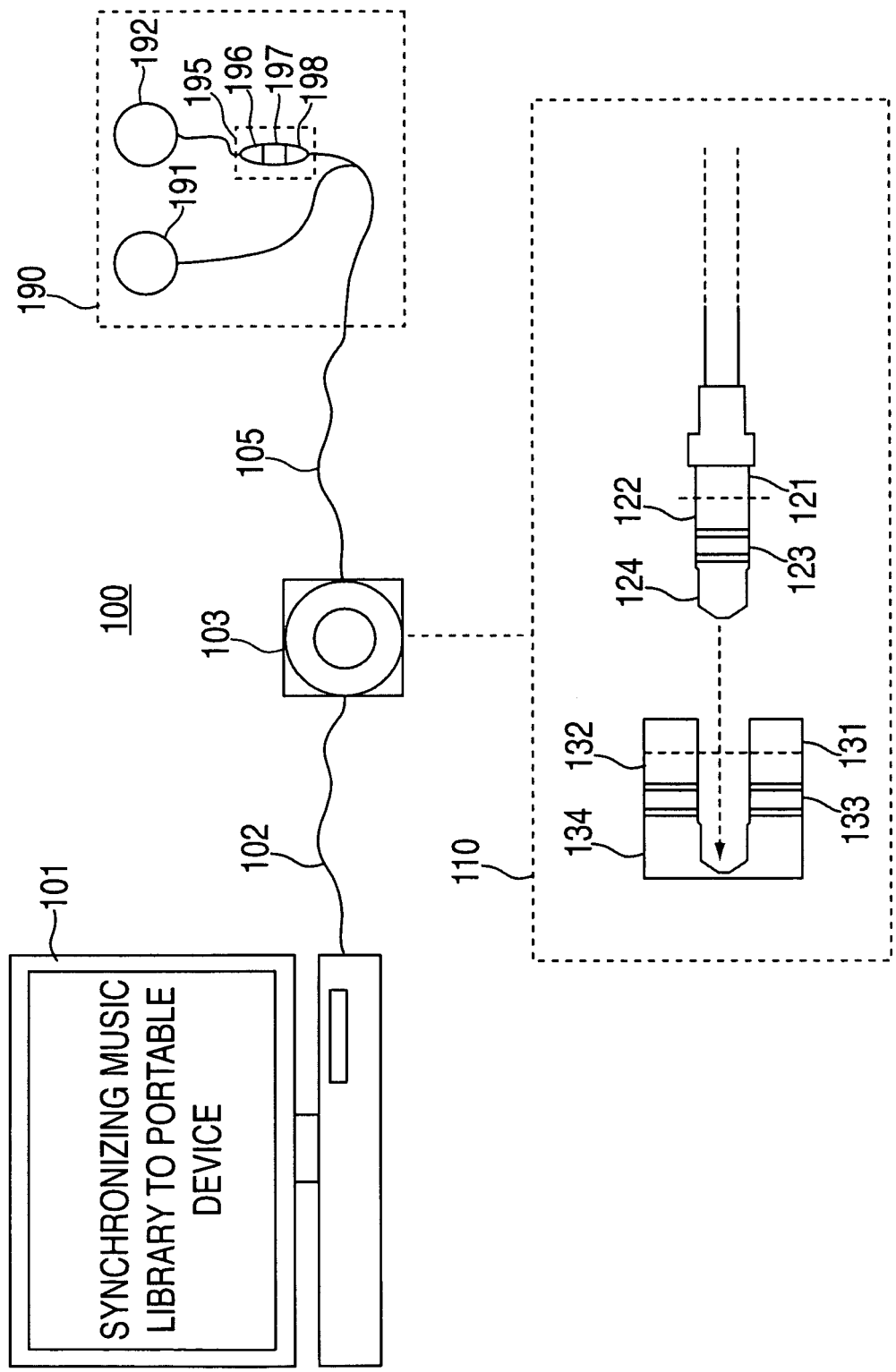
FIG. 1 is a communications topology according to an illustrative embodiment of the invention.

FIG. 1 shows communications topology 100 that may include computer 101, media device 103, and audio communications device 190. Media device 103 may communicate with computer 101 via communications channel 102. Media device 103 may communicate with audio communications device 190 via communications channel 105. In one embodiment, communications channel 105 is a wired communication channel. Alternatively, a communications channel may be wireless.

Media device 103 may take any form. For example, media device 103 may be a portable media player such as a portable music player. Media device 103 may also include, for example, a mobile telephone that may play downloaded media. Media may be downloaded directly to the media device 103 or may be downloaded to computer 101 and transferred to the media device 103 via communications channel 102.

Figure 5:
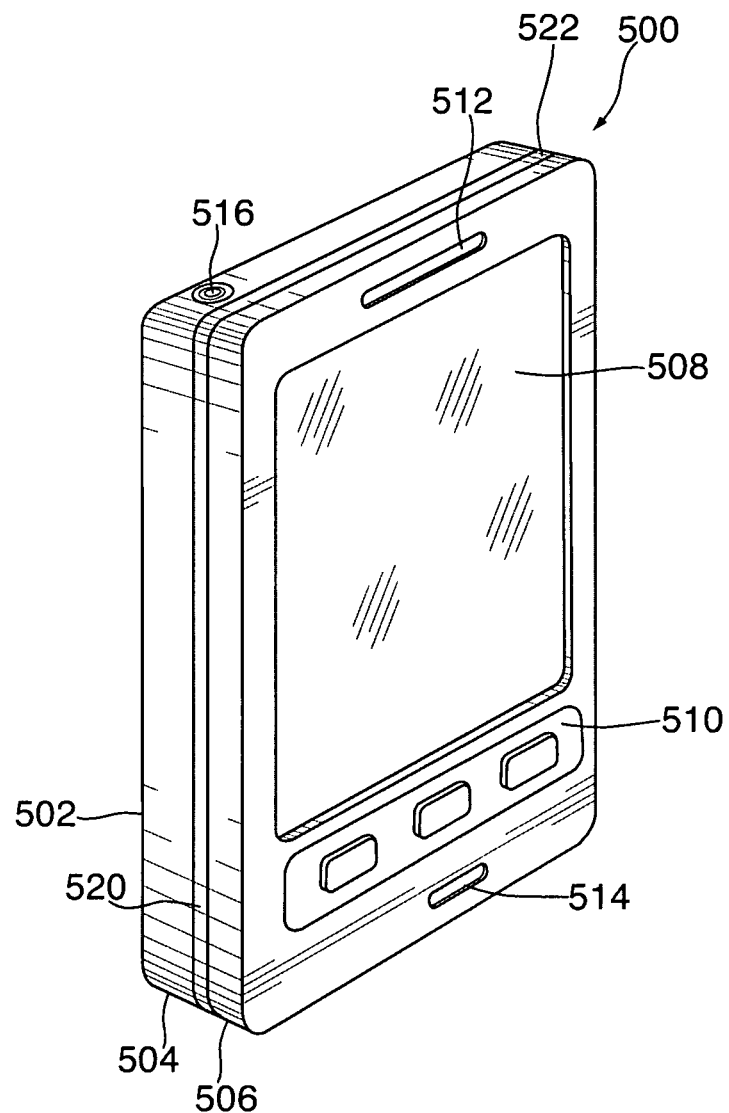
FIG. 5 is a perspective view of a media device according to an illustrative embodiment of the invention.

The media device 103 may include a wireless communications device such as a cellular telephone, satellite telephone, cordless telephone, personal digital assistant (PDA), pager, portable computer, or any other device capable of wireless communications. In fact, FIG. 5 shows an exemplary cellular telephone version of a broad category of media device 103. The media device 103 may be compact, portable, mobile, personal, and/or transportable.

The media device 103 may also be integrated within the packaging of other devices or structures such as a vehicle, video game system, appliance, clothing, helmet, glasses, wearable apparel, stereo system, computer system, entertainment system, or other portable devices. In certain embodiments, the media device 103 may be docked or connected to a wireless (e.g., a wi-fi docking system) and/or radio enabling accessory system (e.g., AM/FM or satellite radio receiver) that provides the media device 103 with short-range communicating functionality and/or radio reception capability. Alternative types of media devices 103 may include, for example, a media player such as an iPod®, iPod® Nano, iPod® Shuffle, or Apple® iPhone available by Apple Inc., of Cupertino, Calif., pocket-sized personal computers such as an iPAQ® Pocket PC available by Hewlett Packard Inc., of Palo Alto, Calif. and any other device capable of communicating wirelessly (with or without the aid of a wireless enabling accessory system).

In certain embodiments, the media device 103 may synchronize with, for example, a remote computing system or server, e.g., computer 101, to receive media (using either wireless or wireline communications paths). Wireless syncing enables the media device 103 to transmit and receive media and data without requiring a wired connection. Media may include, without limitation, sound or audio files, music, video, multi-media, and digital data, in streaming and/or discrete (e.g., files and packets) formats.

During synchronization, a host system, e.g., device 101, may provide media to a client system or software application embedded within the media device 103. In certain embodiments, media and/or data is "downloaded" to the media device 103. In other embodiments, the media device 103 is capable of uploading media to a remote host or other client system.

Audio communications device 190, e.g., a headset, may be utilized to provide an audio functionality associated with media device 103. Audio communications device 190 may include speakers 191 and 192 as well as microphone 195. Hence, the audio communications device 190 may be referred to as a head set device. Control interfaces 196, 197, and 198 and microphone 195 may be included in a peripheral control unit (PCU) 194. Accordingly, the PCU 194 may include multiple control interfaces such that the PCU 194 may receive audio input as well as tactile input.

Control interfaces 196, 197, and 198 of the PCU 194 may provide the audio communications device 190 with the capability to communicate control information to media device 103. Accordingly, audio communications device 190 may control the operation of any function of media device 103. Accordingly, for example, a telephone call may be received by media device 103 and a user may interact with the telephone call via audio communications device 190. Particularly, a user may transmit audio communications with another participant of the telephone call through media device 103 via microphone 195. The user may receive audio communications with another participant of the telephone call through media device 103 via speakers 191 and 192.

By including multiple control interfaces 196, 197, and 198 in the audio communications device 190, a user may be able to perform any function that the user could perform using the control interfaces of media device 103. For example, control interfaces 196 and 198 may allow a user to change the volume of a call. Particularly, for example, control interface 196 may increase (or decrease) the volume of a call while control interface 198 may decrease (or increase) the volume of a call. Control interface 197 may, for example, be utilized to initiate and/or terminate a call. Control interfaces may perform a number of functions. Such functions may be dependent on the operating environment of either media device 103 or audio communications device 190. For example, button 197 may be utilized to pause a song when media device 103 is in the operating environment of playing a song. As per another example, button 197 may be utilized to mute a call when media device 103 is in the operating environment of handling the communication of a telephone call.

Control interfaces 196, 197, and 198 may take any form. A control interface may, for example, be a wheel, a button, a single-touch screen, a multiple-touch screen, and/or a switch. Control interfaces may be activated to provide control information in a number of ways. For example, control interface 196 may be a button that may activate the transmission of one type of control information when pressed, another type of control information when depressed, and yet another type of control information when being held down for a particular period of time (e.g., approximately two seconds or more).

Each type of control information may cause media device 103 or audio communications device 190 to perform a particular function. For example, the pressing of a button (e.g., control interface 197) may switch one song that is being played by media device 103 to the next song that will be played by media device 103. Furthering this example, the holding of the button in the pressed position may cause media device 103 to fast forward a song that is being played.

Communications channel 105 may be, for example, a multiple-wire (e.g., four wire) cable permanently connected to audio communications device 190. Communications channel 105 may include a plug that is operable to mate with a jack located on, for example, media device 103. Such a plug may take the form of a multiple-region (e.g., a four-region) male connector. Similarly, such a jack may take the form of a multiple region (e.g., a four-region) female connector. The mating of communication channel 105 to media device 103 may take the form of connection 110.

Connection 110 may include a multiple-region male plug that includes regions 124, 123, 122, and 121. Region 124 may be, for example, a right (or left) audio channel. Region 123 may be, for example, a left (or right) audio channel. Region 122 may be, for example, a ground channel. Region 121 may be, for example, a microphone channel. Such a multiple-region male plug may mate with a multiple-region female plug that includes regions 131, 132, 133, and 134. Region 134 may be, for example, a right (or left) audio channel. Region 133 may be, for example, a left (orright) audio channel. Region 132 may be, for example, a ground channel. Region 131 may be, for example, a microphone channel.

Persons skilled in the art will appreciate that power may be supplied to an audio communications device via a communications channel having a jack that is mateable with a media device. In this manner, the media device 103 may provide power to the audio communications device. For example, a four-region jack may include a microphone channel. Such a microphone channel may supply electrical energy to an accessory (e.g., an audio communications device) while receiving microphone audio information from the accessory. Additional information, such as control information, may be communicated through the microphone channel. Accordingly, the media device 103 may include circuitry that can discern control information from microphone audio information. Such a media device may separate the control information from the microphone information. In doing so, the media device 103 may send the control information to one feature and send the microphone audio information to another feature.

Control information may be embedded with microphone information in many ways. For example, the control information may be transmitted through a channel as tones. Such tones may take the form of, for example, ultrasonic current pulses (e.g., 75-300 KHz current pulses), while microphone audio information is transmitted at audible frequencies. In doing so, for example, a receiving user or particular media device circuitry may not be able to detect the ultrasonic frequency data amongst the audible frequency data. For example, a microphone codec located at a media device may be provided with the ultrasonic and audible frequency, yet may be configured to only see and/or detect the audible frequency data. In doing so, for example, the ultrasonic frequency information may not need to be stripped apart from the audible frequency information. The ultrasonic and audible microphone frequency information may be transmitted as current pulses across a channel (e.g., a microphone channel).

Ultrasonic and/or high frequency information and audible microphone frequency information may be transmitted as an analog signal. In one embodiment, the high frequency range includes a range of tones above the threshold for human hearing and less than about 1 Mhz. Alternatively, for example, an audio communications device and a media device may be configured to communicate digitally. Persons skilled in the art will appreciate that microphone information and control information may be transmitted digitally across a microphone node.

The audio communications device may include a microphone. Accordingly, the audio communications device may be configured, for example, to constantly supply current to the microphone, in order to keep the microphone constantly active, when power is supplied to the audio communications device through a microphone channel. In doing so, for example, the occurrence of audible artifacts may be eliminated while control interfaces are used that introduce additional signal information into the microphone channel. In other words, for example, the occurrence of audible blips and moments of silence may be eliminated as control interface switching occurs. The audio communications device may also be configured to include the ability to turn the current supplied to the microphone OFF. Such an ability may be user-controlled via a control interface (e.g., a button) and/or media device controlled and/or audio communications device controlled.

An audio communications device, such as a pair of earphones, may include any type of microphone. For example, an audio communications device may include a voltage-based (e.g., a MEMS microphone) or current-based condenser-type microphone (e.g., an Electret microphone).

Device-to-Device handshaking may occur through a communications channel, such as a microphone channel. A handshake between a media device and an audio communications device may include, for example, device identification, communication initialization, security protocol establishment, and/or timing synchronization. In doing so, for example, a device (e.g., a media device) may be able to identify the accessory that is coupled to the device (e.g., an audio communications device). The device may then determine, based on the identification process, whether to further communicate with the accessory and how to further communicate with the accessory. For example, the device may recognize the identification of an accessory as a pair of earphones that includes a microphone and multiple interface control scheme. Accordingly, the device may turn ON associated features such as a microphone codec and a control information reception/management circuit.

Security protocols may also be in place during handshaking such that an accessory may be required by a device to transmit particular security information before the accessory can interact with the device. In doing so, for example, the device may be protected against control signals sent through a microphone channel by an unknown device. Furthermore, for example, synchronization may occur during device handshaking Such synchronization may be utilized to synchronize the timing of circuitry on a device and an accessory. Additional processes may be added during device handshaking. For example, device testing may occur. Also, for example, power may be supplied to a microphone for a period of time until the microphone is ready to be used and a media device may perform a check to make sure that a microphone is ready to use. The media device may, for example, check to make sure the features of an accessory are in working condition. Handshaking may be controlled by any device and any device may be the master of any subsequent communications. For example, a device may be a slave to an accessory.

Persons skilled in the art will appreciate that the features provided herein may extend beyond a media device to accessory communications. More particularly, the features provided herein may be provided in any device-to-device communications as well as in-device circuit-to-circuit communications. For example, a microphone-enabled device may be mated with any device such as a car, plane, boat, train, home computer, server, laptop computer, cellular phone, tablet computer, Personal Digital Assistant (PDA), or any other device.

Figure 2:
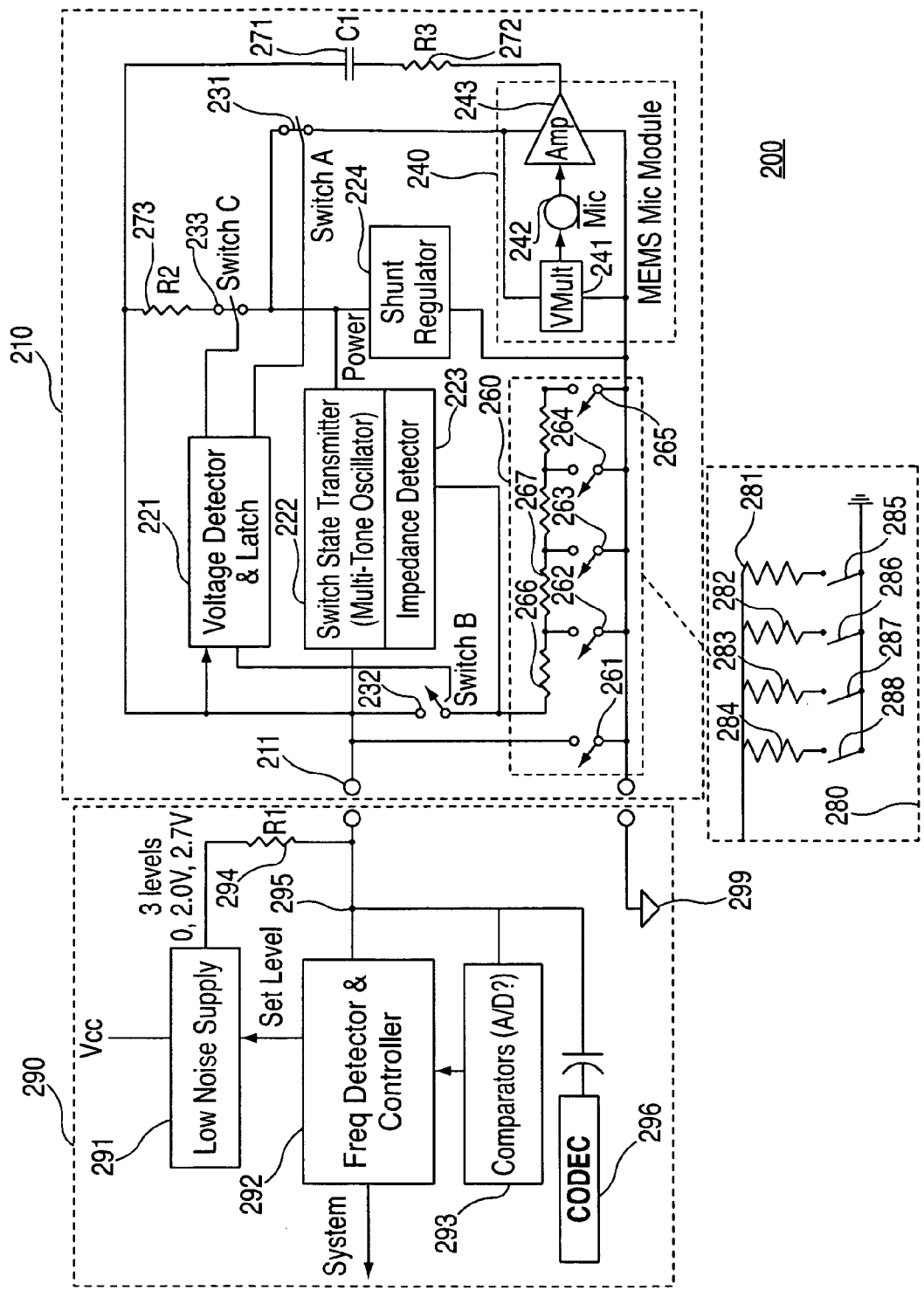
FIG. 2 is a communication topology between a media device and an audio communications device including a MEMS microphone module according to an illustrative embodiment of the invention.

FIG. 2 shows communication topology 200 between a device and an audio communications device. Such a media device, e.g., media device 103, may include, for example, circuit 290. Such an audio communications device, e.g., audio communications device 190, may include circuit 210. Circuit 210 may be housed, for example, within the PCU 194 of audio communications device 190.

Circuit 290 of a media device may include low noise power supply 291, frequency detector and controller 292, resistor 294, comparators 293, and codec 296. Circuit 290 may also include, for example, a source of electrical energy as well as any other hardware and/or software needed for any particular function. For example, circuit 290 may communicate with a media operating system that runs applications/hardware for providing telephonic and media-playing functionalities.

Circuit 210 of an audio communications device may include, for example, control interfaces 260, switch 231, switch 232, switch 233, voltage detector and latch 221, shunt regulator 224, microphone 240, resistor 273, resistor 272, and capacitor 271. Circuit 290 may couple to circuit 210 through node 211, which may be a microphone node that also provides power from circuit 290 to circuit 210. Circuit 210 may also couple to ground by coupling to a ground terminal of circuit 290. Persons skilled in the art will appreciate that a ground terminal may be, for example, a virtual ground. Such a virtual ground may take the form of, for example, a stable voltage that is lower than a power voltage. Accordingly, the virtual ground and power voltage may have a particular differential voltage that is utilized to power circuit 210 (e.g., approximately 2-3.2 volts in differential)

Generally, circuits 210 and 290 may operate, for example, as follows. Circuit 210 may provide one of a number of voltages. For example, circuit 210 may provide 0 volts, 2.0 volts, or 2.7 volts. 0 volts may correspond to, for example, the situation when the media device is OFF or the media device has been instructed to stop communications with the audio communications device. 2.0 volts may be provided by one group of media devices while 2.7 volts may be provided by another group of media devices. Accordingly, the voltage initially supplied through a microphone channel may be utilized to identify a media device as being part of a particular group. Circuit 210 may operate differently depending on the voltage that is provided. Accordingly, circuit 210 may be able to operate with different groups of devices. One group of device (e.g., a group that supplies 2.0 volts) may not include a microphone functionality while another group may (e.g., a group that supplies 2.7 volts) include a microphone functionality. Persons skilled in the art will appreciate that a single device may change the supply voltage that is provided to an accessory based, in part, for example on the type of use desired by the media device for the accessory. For example, a media telephone having a multimedia feature may provide 2.0 volts when the multimedia feature is being used (e.g., and thus not utilize a microphone), yet such a device may provide 2.7 volts when a telephonic feature is being used (e.g., and thus utilize a microphone).

Circuit 210 may be able to operate differently in any number of power supply conditions. For example, circuit 210 may be able to operate differently under three power supply conditions such as HIGH (e.g., 2.7 volts), MEDIUM, (e.g., 2.0 volts), and LOW (e.g., 0 volts). Circuit 210 may be operable to operate differently under two (e.g., HIGH and LOW) or more than three power supply conditions. Higher powered media devices may be configured to provide HIGH and LOW power supply voltages while lower powered media devices may be configured to provide MEDIUM and LOW power supply voltages. For example, a portable telephone with multimedia features may be a higher powered media device while a media player without a display (and/or telephonic feature) may be a lower powered media device.

Suppose, for example, circuit 210 receives a power supply voltage of 2.7 volts from circuit 290. At such a power supply voltage, for example, switch 233 and switch 231 may turn ON. Particularly, voltage detector and latch 221 may detect the power supply voltage and may provide switching voltages to switch 231 and switch 232. In doing so, for example, power may be provided to microphone 240 by providing power to amplifier 243 and voltage multiplier 241. Accordingly, the appropriate power supply voltage may turn microphone 240 ON. Similarly, the turning ON of switch 233 may provide power to switch state transmitter 222 and impedance detector 223. Switch state transmitter 222 may, for example, be a multi-tone oscillator. Persons skilled in the art will appreciate that voltage detector and latch 221 may communicate information to, for example, switch state transmitter 222 and impedance detector 223. Accordingly, voltage detector and latch 221 may be able to discern differences in power supply voltages if, for example, additional information was communicated to circuit 210 via a power supply voltage. Thus, voltage detector and latch 221 may communicate this additional information to other structures of circuit 210 such as switch state transmitter 222 and impedance detector 223.

Persons skilled in the art will appreciate that voltage detector and latch 221 may include a latch, for example, in order to hold switching voltages for switches 231-233 at a particular voltage to hold a particular state of switches 231-233. Persons skilled in the art will also appreciate that switches 231-233 may initially be ON and that voltage detector and latch 221 may selectively turn switches 231-233 OFF. Similarly, switches 231-233 may initially be OFF and voltage detector and latch 221 may selectively turn switches 231-233 ON. Accordingly, voltage detector and latch 221 may turn switch 232 OFF and leave switches 233 and 231 ON when an appropriate voltage is detected (e.g., approximately 2.7 volts).

Switch state transmitter 222 may be a multi-tone oscillator and may, for example, transmit a handshake to circuit 290 in response to receiving a particular voltage (e.g., approximately 2.7 volts) from circuit 290. Such a handshake may, for example, communicate identification information to circuit 290. Such identification information may, for example, instruct circuit 290 as to the type of accessory that circuit 210 resides in. Accordingly, circuit 210 may communicate, via a handshake performed by transmitter 222, such that circuit 210 resides in an audio communications device that includes a microphone, two speakers embodied as headphones, and a three-button controller.

Transmitter 222 may communicate any type of identification information or other information used in a handshaking process. For example, transmitter 222 may communicate a password in response to receiving information from circuit 290 indicative of a security challenge. If circuit 290 does not receive the appropriate password, authentication data, and/or cryptographic response for the security challenge, either circuit 210 and/or circuit 290 may turn OFF (e.g., the media device and or accessory may terminate communications). Persons skilled in the art will appreciate that transmitter 222 may communicate the state of the switches of circuit 210. In doing so, for example, circuit 290 may be able to determine the type of accessory that circuit 210 is included in by determining what type of accessory particular switches would be turned ON in. For example, an accessory without a microphone may not include switch 231 and/or transmitter 222 may transmit that switch 231 is OFF in such an instance.

Impedance Detector 223 may, for example, detect the use of control interface circuit 260. More particularly, for example, impedance detector may detect different impedance levels of the output of control interface circuit 260 and may determine how a user interacted with control interface circuit 260 based on the detected impedance level. Accordingly, for example, impedance detector 223 may provide this information to other circuitry of circuit 210 (e.g., transmitter 222). In this manner, transmitter 222 may transmit information about the state of control interface circuit 260 to another device (e.g., a device that includes circuit 290). Transmitter 222 may transmit information as current pulses. For example, transmitter 222 may transmit information as ultrasonic current pulses (e.g., approximately 75-300 KHz) and/or high frequency tones.

Control interface circuit 260 may include any number of control interfaces such as, for example, one or more touch screens, wheels, buttons, and/or any other type of interface. For example, control interface circuit 260 may include multiple buttons (e.g., 3, 4, 5, or more).

Each button may close a connection between a particular resistor, or resistors, with ground such that impedance detector 223 may be provided with a different level of impedance depending on which button is pressed. For example, control interface circuit 260 may include buttons 261-265. When button 262 is pressed, impedance detector 223 may detect the impedance of resistor 266 and, accordingly, may utilize the detection of this impedance as a control signal. When button 263 is pressed, impedance detector 223 may detect the impedance of resistor 266 in series with resistor 267 and, accordingly, may utilize the detection of this impedance as another control signal. Persons skilled in the art will appreciate that when button 261 is pressed, node 211 may be brought to ground. This, for example, may turn circuit 210 OFF. Button 261 may, or may not, for example, be included in control interface circuit 260. In other words, button 261 may be controlled by circuit 210 and may not be user-controlled. Similarly, voltage detector and latch 221 may control when control interface circuit 260 is turned ON and is operable to interact with impedance detector 223.

Control interfaces may be configured, for example, in a variety of ways. Control interface circuit 260 may be configured, for example, such that only the interaction of a single button can be detected at any given time. Thus, impedance detector may detect the pressing of button 262, the holding down of button 262 for a period of time, and the depressing of button 262. However, an interface may be provided that is operable to detect the simultaneous operation of multiple buttons (e.g., or multiple touches to a touch screen).

Control interface circuit 280 may be utilized, for example, to detect the simultaneous activation of multiple control interfaces. To obtain this functionality, for example, series configurations of switches and resistors may be placed in a parallel configuration. The resistors may, for example, have different resistances. When a single button is pressed, for example, the impedance of a single resistor may be detected by impedance detector 223 and discerned as a single button activity. However, when more than one button is pressed, for example, a difference impedance profile may be detected by impedance detector 223 than when any single button is pressed.

Similarly, when more than one button is pressed, for example, a difference impedance profile may be detected by impedance detector 223 than any other combination of simultaneous button presses. For example, when buttons 288 and 287 are pressed, impedance detector 223 may detect the impedance profile of resistors 284 and 283 in a parallel configuration. If resistors 281-285 are provided, for example, with particular different resistances, impedance detector 223 may be able to detect the simultaneous press of any number (e.g., all) of switches 285-288.

Persons skilled in the art will appreciate that any detector may be used to detect user interaction with a control interface circuit. For example, a capacitive touch-screen may be utilized and a detector may be provided that is able to discern different capacitance profiles.

Shunt regulator 224 may be utilized to assist in maintaining a constant current draw from microphone 240 even when, for example, control interfaces of control interface circuit 260 are being utilized. Particularly, shunt regulator may be coupled to, and operate with, microphone 240 when, for example switches 233 and 231 are CLOSED. Accordingly, circuit 290 may allow for simultaneous operation of control interface circuit 260 and microphone 240. Shunt regulator 224 may, for example, be used with resistor 272 to keep the signal from microphone 240 on node 211 independent from variations introduced on the power node of transmitter 222 by transmitter 222. In doing so, the introduction of audible pops and moments of silence may be eliminated when control interfaces of control interface circuit 260 are utilized while microphone 240 is being utilized.

Frequency detector and controller 292 may receive tones from transmitter 222 and may utilize such tones to control the operation of a device. Persons skilled in the art will appreciate that if a handshake indicates that an accessory has no microphone, frequency detector and controller 292 may set low noise supply circuit 291 to a MEDIUM voltage (e.g., 2.0 volts). In doing so, for example, frequency detector and controller 292 may OPEN switch 233, OPEN switch 231, and CLOSE switch 232. In doing so, microphone 240 may be turned OFF and control interface circuit 260 may be the only device transmitting information across node 211. In this manner, for example, frequency detector and controller 292 may expect to receive only control interface information across 295 and may accordingly change how node 295 is utilized. For example, frequency detector and controller 292 may turn OFF microphone codec 296.

Persons skilled in the art will appreciate that some devices that include circuit 290 may be configured to initially provide 2.0 volts. For example, some devices may not have the capability to utilize a microphone input and, accordingly, may not include microphone codec 296. Similarly, an accessory that utilizes circuit 210 may be able to be backwards compatible with a variety of devices that provide at least one of a variety of initial power supply voltages (e.g., LOW, MEDIUM, and HIGH).

Persons skilled in the art will appreciate that a device may be configured to initially provide a particular power supply voltage (e.g., a MEDIUM voltage) for a particular amount of time (e.g., 100 ms) and then change the power supply voltage to a different voltage (e.g., a HIGH voltage). In doing so, for example, circuit 290 may be able to perform particular features and then may be able to alternate the state of operation in order to provide additional or alternate features (e.g., the inclusion of a microphone functionality).

Persons skilled in the art will also appreciate that some devices may not support multiple-control interface (e.g., multiple-button) functionality. Accordingly, for example, a device may change from one voltage to a second voltage (e.g., a MEDIUM to a HIGH) after a period of time (e.g., 100 ms) in order to indicate that the device includes multiple-control interface functionality. Accordingly, circuit 210 may operate to provide only a single control interface (or no control interface). Alternatively, for example, the device may provide a particular voltage (e.g., a HIGH voltage) and circuit 290 may operate with no, or a single, control interface support. Alternatively still, for example, multiple control interface information may be transmitted to a device that does not include multiple control information support if, for example, the device will just ignore, or not recognize, such multiple control information. When circuit 210 detects a device that can only operate, for example, with a single control interface, circuit 210 may ignore the button presses from all but one control interface.

Figure 3A:
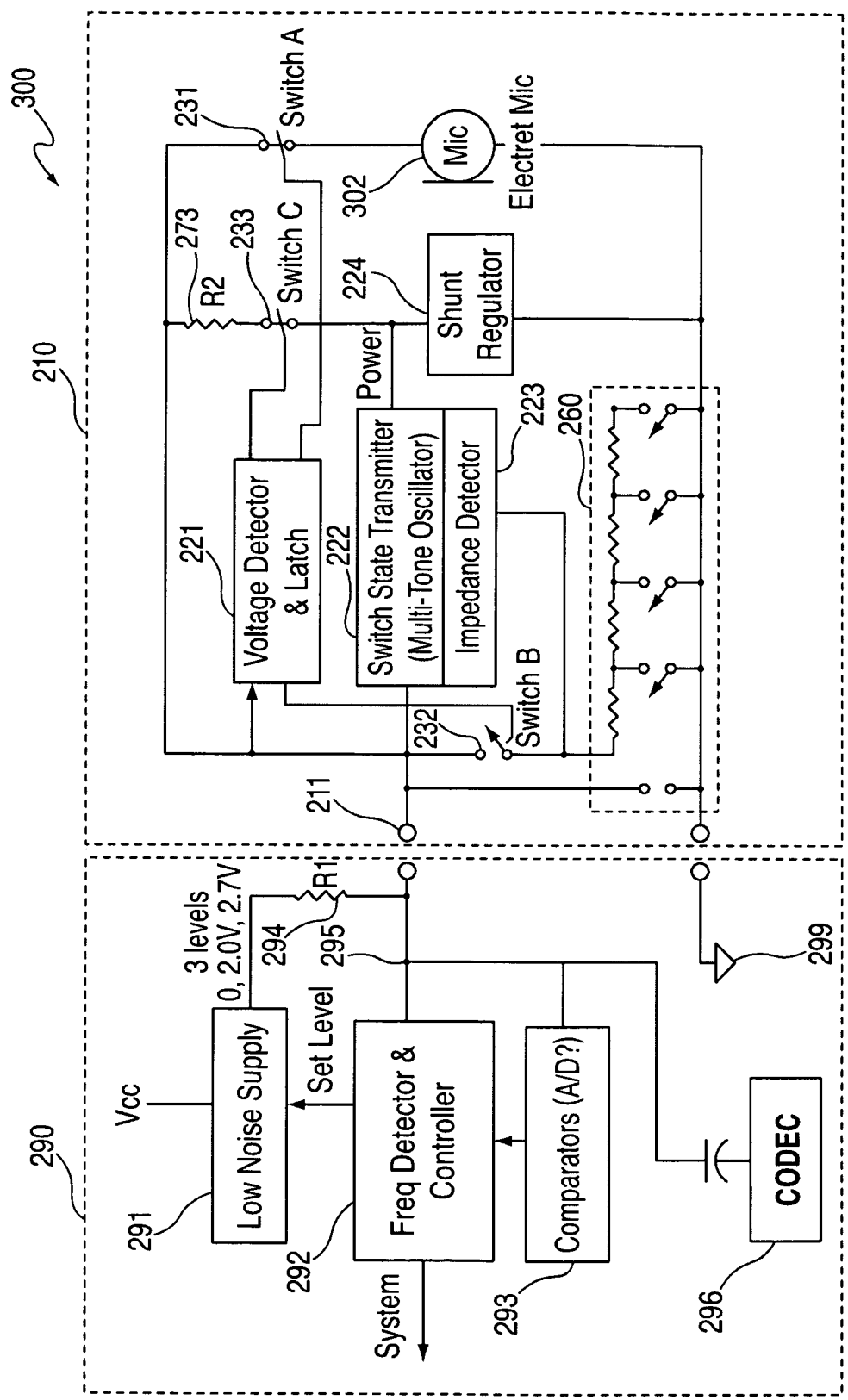
FIG. 3A is a communication topology between a media device and an audio communications device including a condenser-based microphone according to an illustrative embodiment of the invention.

FIG. 3A is a communication topology 300 between a media device (via circuit 290) and an audio communications device (via circuit 210) including a condenser-type microphone 302 according to an illustrative embodiment of the invention. In one embodiment, the microphone 302 includes a current driven microphone such as, for example, an electret microphone. An electret microphone may include, without limitation, a foil-type electret, diaphragm-type electret, front electret, and back electret. In certain embodiments, the condenser-type microphone 302 enables the power supply 291 to function as a current source for the microphone 302. By employing a current source, the circuit 210 may improve power supply noise rejection and, thereby, improve circuit 210 communications performance.

Figure 3B:
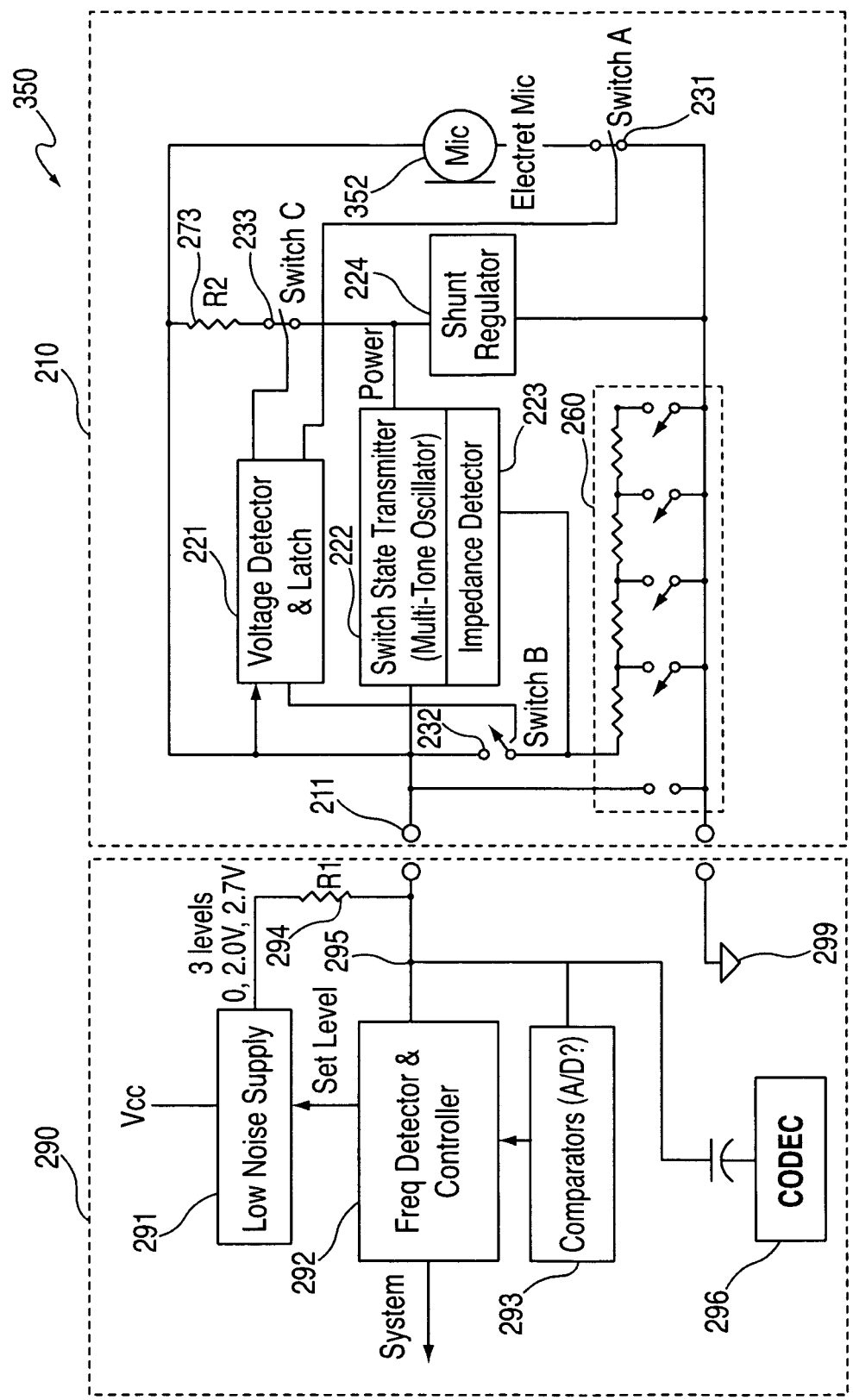
FIG. 3B is a communication topology between a media device and an audio communications device including an alternate switch configuration according to an illustrative embodiment of the invention.

FIG. 3B is a communication topology 350 between a media device (via circuit 290) and an audio communications device (via circuit 210) including an alternate switch 231 configuration according to an illustrative embodiment of the invention. In contrast with the communication topology 300, the communication topology 350 includes a circuit configuration in which the switch 231 is positioned on the common (ground) side of the condenser-type microphone 352. In addition to the advantageous effects of using a current source to improve noise rejection, the positioning of the switch 231 may further enhance noise rejection and improve circuit 210 communications performance.

Figure 4:
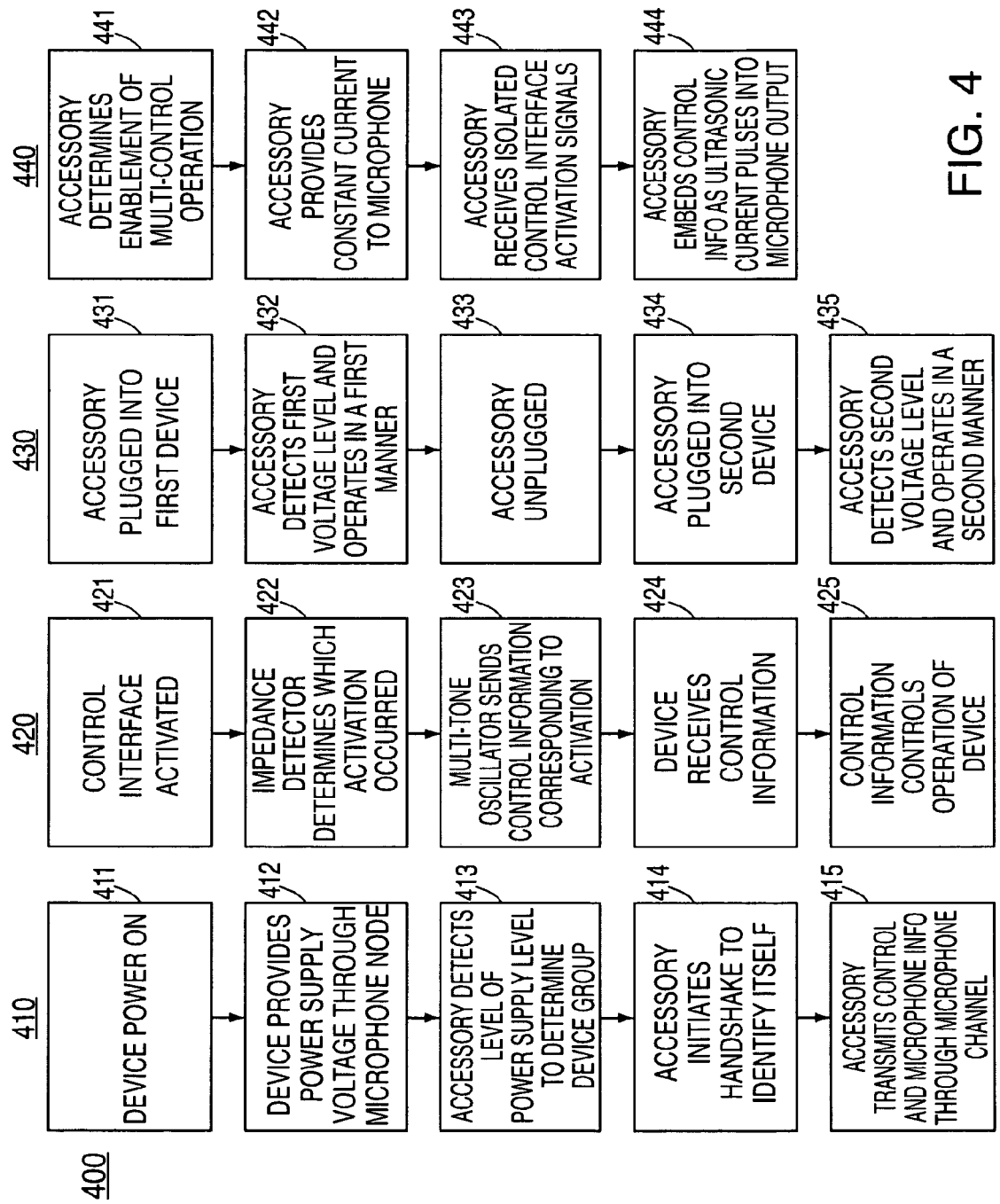
FIG. 4 includes an exemplary flow chart of the process between a media device and an audio communications device according to an illustrative embodiment of the invention.

FIG. 4 is an illustration of a process flow chart 400. Process flow chart 400 may, for example, be utilized to communicate information between a device, e.g., media device 103, and an accessory, e.g., audio communications device 190.

Flow chart 400 may include step 411, in which a device is powered ON. A device may be powered ON via, for example, a manual hardware switch located on either the device or an accessory. Step 412 may be included in which the device provides a power supply voltage to an accessory mated with the device. Such a power supply voltage may be provided, for example, across the microphone node of a jack. In step 413, the accessory may detect the level of the power supply voltage that was provided to the accessory. In doing so, for example, the accessory may determine a group for the device. For example, the accessory may determine that a device is one that is only able to receive control information associated with a single control interface or is able to receive control information associated with multiple control interfaces.

In step 414, for example, the accessory may transmit a handshake to the device. Such a handshake, for example, may be utilized to identify the accessory (e.g., as a device that includes a microphone or that does not include a microphone. Such a handshake may alternatively, for example, be utilized to confirm that the accessory is operating and is ready to continue with a communication. Person skilled in the art will appreciate that an accessory may need time to power up once a power supply voltage is received. Accordingly, a handshake may be utilized to signal a device that such a power up process has been completed and that communications can begin between the device and the accessory. In step 415, the accessory may transmit control and microphone information through a microphone channel. One or more microphone channels may be provided on a jack and/or plug.

Flow chart 420 may be utilized in a communications topology between a device and an accessory. Step 421 may be included, in which one or more control interfaces may be activated. A detector, such as an impedance detector, may detect such an activation and determine the origination of the activation (e.g., the depress of a third button) in step 422. In step 423, for example, a multi-tone oscillator may provide second control information corresponding to the determined activation through the microphone node of a plug. A device may then receive the control information in step 424 and the control information may control the operation of the device in step 425.

Flow chart 430 may be utilized in a communications topology between a device and an accessory. In step 431, an accessory may be plugged into a device. In step 432, the accessory may detect a first voltage level of a power supply voltage and the accessory may place itself in a first manner of operation as a result of the detected voltage level. In step 433, the accessory may be unplugged. In step 434, the accessory may be plugged into a second device. In step 435, for example, the accessory may detect a second voltage level of a power supply voltage and the accessory may place itself in a second manner of operation as a result of the detected voltage level.

Flow chart 440 may be utilized in a communications topology between a device and an accessory. In step 441, an accessory may determine the enablement of the operation of multiple interfaces located on the accessory. In step 442, for example, the accessory may provide constant current to a microphone of the accessory. In step 443, the accessory may receive control interface activation signals from control interfaces that are isolated from the output of a microphone. In step 444, the accessory may then embed the control information into the microphone node of an output plug as ultrasonic current pulses.

FIG. 5 is a perspective view of a media device 500 according to an illustrative embodiment of the invention. The device 500 includes a housing 502, a first housing portion 504, a second housing portion 506, a display 508, a keypad 510, a speaker housing aperture 512, a microphone housing aperture 514, a headphone jack 516, and frame sidewall 522. In certain embodiments, the frame sidewall 522 is the exposed portion of a frame residing within or adjacent to the housing 502 that provides structural support for the media device 500 and various internal components.

In one embodiment, the housing 502 includes a first housing portion 504 and a second housing portion 506 that are fastened together and/or to the frame sidewall 522 to encase various components of the media device 500. The housing 502 and its housing portions 504 and 506 may include polymer-based materials that are formed by, for example, injection molding to define the form factor of the media device 500. In one embodiment, the housing 502 surrounds and/or supports internal components such as, for example, a display 508, one or more circuit boards having integrated circuit components, internal radio frequency (RF) circuitry, an internal antenna, a speaker, a microphone, a hard drive, a processor, and other components. Further details regarding certain internal components are discussed herein with respect to FIG.

6. The housing 502 provides for mounting of a display 508, keypad 510, external jack 516, data connectors, or other external interface elements. The housing 502 may include one or more housing apertures 512 to facilitate delivery of sound, including voice and music, to a user from a speaker within the housing 502. The housing 502 may include one or more housing apertures 514 to facilitate the reception of sounds, such as voice, for an internal microphone from a device user.

Personal computing devices and/or media devices of this type may include a touchscreen remote control, such as a Pronto made available by Royal Philips Electronics of the Netherlands or a handheld GPS receiver made available by Garmin International, Inc. of Olathe, Kans. In certain embodiments, the display 508 includes a graphical user interface (GUI) to enable a user to interact with the device 500. The personal computing device 500 may also include an image sensor such as a camera capable of capturing photographic images and/or video images.

Figure 6:
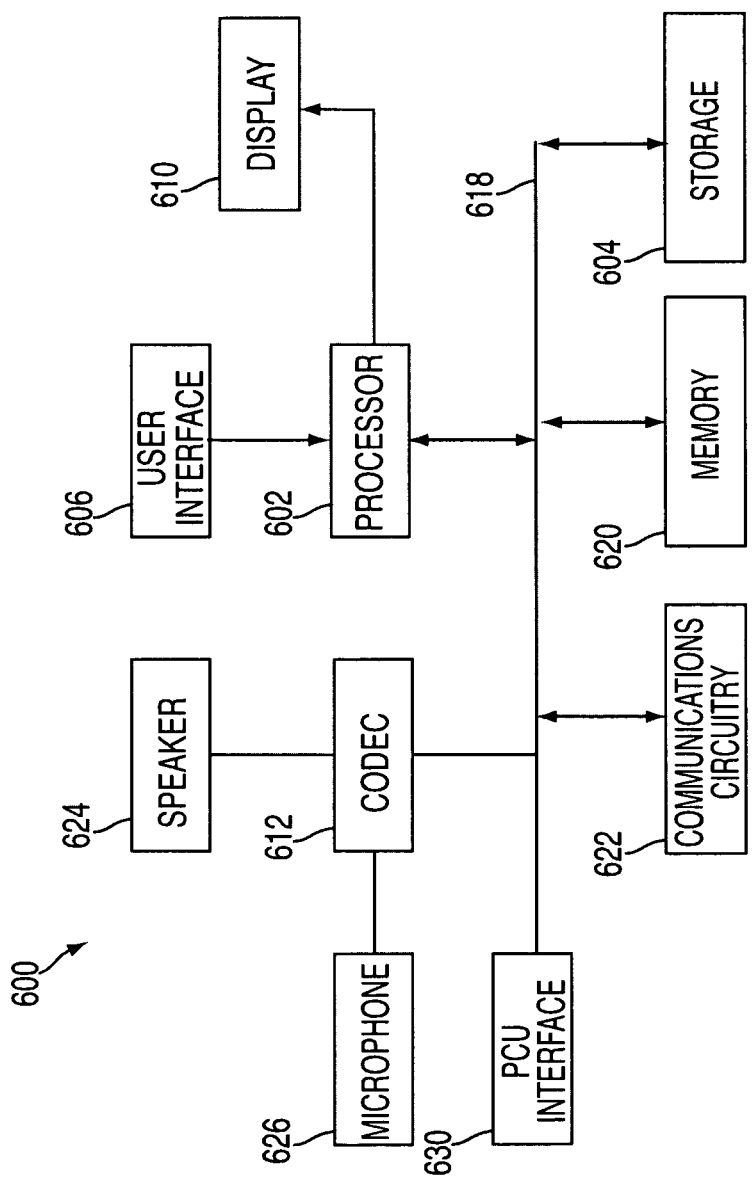
FIG. 6 shows a simplified functional block diagram of a media device according to an illustrative embodiment of the invention.

FIG. 6 shows a simplified functional block diagram of a media device 600 according to an illustrative embodiment of the invention. The block diagram provides a generalized block diagram of a computer system such as may be employed, without limitation, by the media devices 103 and 500. The media device 600 may include a processor 602, storage device 604, user interface 606, display 610, CODEC 612, bus 618, memory 620, communications circuitry 622, a speaker or transducer 624, a microphone 626, and a PCU interface 630 to facilitate communications with an audio communications device. Processor 602 may control the operation of many functions and other circuitry included in media device 600. Processor 602 may drive display 610 and may receive user inputs from the user interface 606.

Storage device 604 may store media (e.g., music and video files), software (e.g., for implanting functions on device 600), preference information (e.g., media playback preferences), lifestyle information (e.g., food preferences), personal information (e.g., information obtained by exercise monitoring equipment), transaction information, word processing information, personal productivity information, wireless connection information (e.g., information that may enable media device to establish wireless communication with another device), subscription information (e.g., information that keeps track of podcasts or television shows or other media that a user subscribes to), and any other suitable data. Storage device 604 may include one more storage mediums, including for example, a hard-drive, permanent memory such as ROM, semi-permanent memory such as RAM, or cache.

Memory 620 may include one or more different types of memory which may be used for performing device functions. For example, memory 620 may include cache, ROM, and/or RAM. Bus 618 may provide a data transfer path for transferring data to, from, or between at least storage device 604, memory 620, and processor 602. Coder/decoder (CODEC) 612 may be included to convert digital audio signals into analog signals for driving the speaker 624 to produce sound including voice, music, and other like audio. The CODEC 612 may also convert audio inputs from the microphone 626 into digital audio signals. The CODEC 612 may include a video CODEC for processing digital and/or analog video signals.

User interface 606 may allow a user to interact with the media device 600. For example, the user interface 606 can take a variety of forms, such as a button, keypad, dial, a click wheel, or a touch screen. Communications circuitry 622 may include circuitry for wireless communication (e.g., short-range and/or long range communication). For example, the wireless communication circuitry may be Wi-Fi enabling circuitry that permits wireless communication according to one of the 802.11 standards. Other wireless network protocols standards could also be used, either in alternative to the identified protocols or in addition to the identified protocol. Other network standards may include Bluetooth, the Global System for Mobile Communications (GSM), code division multiple access (CDMA), and long-term evolution (LTE) based wireless protocols. Communications circuitry 622 may also include circuitry that enables the media device 600 to be electrically coupled to another device (e.g., a computer or an accessory device) and communicate with that other device.

In one embodiment, the media device 600 may be a portable computing device dedicated to processing media such as audio and video. For example, the media device 600 may be a media device such as media player (e.g., MP3 player), a game player, a remote controller, a portable communication device, a remote ordering interface, an audio tour player, or other suitable media device. The media device 600 may be battery-operated and highly portable so as to allow a user to listen to music, play games or video, record video or take pictures, communicate with others, and/or control other devices. In addition, the media device 600 may be sized such that it fits relatively easily into a pocket or hand of the user. By being handheld, the media device 600 (or media devices 103 and 500) is relatively small and easily handled and utilized by its user and thus may be taken practically anywhere the user travels.

The media device 600 may employ a PCU interface 630 to facilitate communications between the media device 600 and a peripheral device such as audio communications device 190. In certain embodiments, the PCU interface 630 includes one or more components of circuit 290 of FIGS. 2, 3A, and 3B. In one embodiment, a portion of the PCU interface 630 is included in the communications circuitry 622.

In certain embodiments, a media device, such as media device 103 or 500, is configured to receive control information from a peripheral control device such as audio communications device 190 and/or its PCU 194. As discussed with respect to FIG. 1, the PCU 194 may include one or more control interfaces. In one embodiment, the control interfaces include three control interfaces 196, 197, and 198. However, the number of control interfaces may include 1, 2, 3, 4, 5, or more than five control interfaces. Also, the type and arrangement of the control interfaces may vary.

In one embodiment, the number of control interfaces is configured to optimize user control via gestures created by one hand of a user. For example, the PCU 194 may have a form factor that enables a user to hold the PCU 194 between the fingers and thumb of one hand of the user. Thus, the user may actuate one or more control interfaces using one or more fingers while simultaneously holding the PCU 194 by applying pressure to the PCU 194 via the user's thumb and at least one finger. One or more control interfaces may be actuated by the user's thumb as well. The size of the PCU 194 may be less than or equal to about 2 in$^3$, 1.5 in$^3$, 1 in$^3$, 0.75 in$^3$, 5 in$^3$, 0.25 in$^3$, 0.125 in$^3$, and 0.1 in$^3$. One length of the PCU 194 may be less than about 4 in, 3 in, 2 in, 1 in, and 0.5 in. The shape of the PCU 194 may include, without limitation, a rectangular form, square form, oval form, spherical form, circular form, multi-sided (e.g., hexagonal) form. In one embodiment, three control interfaces 196, 197, and 198 are positioned on a top surface of the PCU 194 to enable actuation by one or more fingers of a user. In other embodiments, four or five or more control interfaces may be employed.

In certain embodiments, a user manipulates the control interfaces, such as control interfaces 196, 197, and 198, to form one or more control gestures. As discussed with respect to FIG. 2, each control gesture, being associated with a particular sequence of operations of the control interfaces 196, 197, and 198, may be associated with a particular control signal (e.g., control interface information) that is generated by the circuit 210. The control signal may then be transmitted via communications channel 105 to a media device 500 that may include, for example, the circuit 290. The circuit 290 may then detect the control signal using detector 292. The media device 500 may include a processor 602 that processes the detected control signal to determine whether a particular operation of the media device 500 is to be performed. The media device 500 may include a memory 620 and/or data storage component 604 that are capable of storing a list or database 700 of known control gestures. Thus, in one embodiment, the processor 602 compares a control signal associated with a particular user-generated control gesture with a list of known control signals associated with known control gestures. The processor 602 may identify the desired control function by determining the closest match in the database 700 with the received control signal. Once the desired control function is determined, the processor 602 performs the operations necessary to carry out the desired control of the media device 500.

In one embodiment, the media device 500 includes a plurality of software applications and/or subroutines of a software application. The media device 500 may associate a set (or arrangement of a set) of control gestures with a particular application or subroutine, while associating a different set (or arrangement of a set) of control gestures for a different application and/or subroutine. The media device 500 may define control gestures independently for a plurality of applications. Thus, for example, a particular control gesture (e.g., click, press and hold) may define a different operation for one application than another application.

Table 1 shows an exemplary association of user gestures with media device functions or controls that are dependent on the type of application running on the media device. Table 1 includes various exemplary applications such as a media player application, radio application, voice memo record application, voice memo playback application, and exercise application. In no way should this listing be considered limiting. User gesture controls via a PCU 194 may be applied to any type of application, especially those applications where a user employs an audio communications device 190 with a media device 103. As discussed previously, certain gestures may be re-used for different applications to initiate different functions of the media device 500.

TABLE 1

Exemplary Table Associating User Gestures with Media Device Control Depending on the Media Device Application

| Application | Control Buttons | User Gestures | | | |
|---|---|---|---|---|---|
| | | Click | Press & Hold | Double Click | Double Click - Press & Hold |
| Media Player Application | + | Volume up | Volume up ramp | x | x |
| | Center | Play/Pause | * | Next track, Next chapter, Next photo | x |
| | − | Volume down | Volume down ramp | x | x |
| Radio Application | + | Volume up | Volume up ramp | x | x |
| | Center | Mute/Unmute | Tag | Next Preset | x |
| | − | Volume down | Volume down ramp | x | x |
| Voice Memo Record Application | + | x | x | x | x |
| | Center | Pause/Resume | x | x | Launch app & Start/End Record |
| | − | x | x | x | x |
| Voice Memo Playback Application | + | Volume up | Volume up ramp | x | x |
| | Center | Play/Pause | x | Next Chapter | x |
| | − | Volume down | Volume down ramp | x | x |
| Exercise Application | + | Volume up | Volume up ramp | x | x |
| | Center | Voice Feedback | PowerSong | x | x |
| | − | Volume down | Volume down ramp | x | x |

For example, Table 1 shows that the same gesture (e.g., double click) can perform different functions depending on the application that is running on the media device 103 or 500. When the media player application is running, the "double click" gesture may initiate the "Next Track, Next Chapter, Next Photo" function which, for example, changes the currently song to the next song. When the radio application is running, the "double click" gesture may initiate the "Next preset" function which, for example, moves the selected radio station to the next pre-selected radio station. While the voice memo playback application is running, the "double click" gesture may initiate the "Next chapter" function which moves the playback audio to the next chapter and/or segment of recorded audio.

While Table 1 refers to click and double clicks based gestures, it should be understood that gestures may include triple clicks, quadruple clicks, or any number of clicks. In certain embodiments, the media device 103 and/or PCU 194 may recognize and ignore multiple simultaneous button presses or control interface actuations. In other embodiments, the media device 103 and/or PCU 194 may be configured to recognize simultaneous button presses and/or control interface actuations by any two or more control interfaces.

Table 1 illustrates various functions associated with various media device applications and lists associated control gestures used to initiate the various functions. With respect to the media player or playback application, control interface 196 (e.g., V+ button) may be used to increase the audio volume of the speakers of the audio communications device 190. For example, clicking once on the V+ button can increment the volume one step or increment. Pressing and holding the V+ button may cause the volume to ramp up until the button is released. Control interface 198 (e.g., V-button) may be used to decrease the audio volume of the speakers of the audio communications device 190. For example, clicking once on the V− button can decrement the volume one step or decrement. Pressing and holding the V− button may cause the volume to ramp down until the button is released. Control interface 197 (e.g., center button) may be used to play or pause the playing of media such as a song, audio file, video file, and the like. By clicking once on the center button, media playback can be paused if media is currently playing or media playback can be resumed if media is currently paused. By double clicking on the center button, the user can initiate a "next" command to advance media playback to the next song or chapter (or next video and so on).

While a radio application is running, control interface 197 (e.g., center button) may be used to mute or un-mute radio playing or playback. For example, by clicking once on the center button, a user can cause a radio playback to mute if the radio audio is currently playing or return to a previous audio volume level if the radio audio is currently muted. In certain embodiments, the radio application may be configured with preset radio station setting and, thereby, allow a user to conveniently tune to their favorite radio stations. Where there are multiple preset radio stations, the center button may be used to skip to the next preset radio station. For example, by double clicking the center button, the radio tuner will advance to the next preset radio station in an increasing and/or decreasing frequency. By double clicking the center button while at the highest frequency present radio station, the radio tuner may advance to the lowest frequency preset radio station, effectively wrapping around the tuner dial. The radio application may support adjusting audio volume in the same manner as the media playback application. The radio application may also support tagging of particular media such as a song. For example, by pressing and holding the center button while a song is playing, the song can be tagged for later identification and use. In certain embodiments, media such as a song may be designated as taggable or not taggable. For example, a song may be designated as not taggable for certain digital rights reasons which may restrict a user from performing certain operations on the song using the tag feature.

While a voice memo application is running, control interface 197 (e.g., center button) may be used to initiate and end a voice memo. For example, by double clicking and then pressing and holding the center button, a user can launch voice memo application and begin recording audio via, for example, microphone 195. In certain embodiments, a media device, e.g., media device 500, may use an internal microphone 626, microphone 195 of an audio communications device 190, or another accessory microphone. Clicking once on the center button may pause a recording if recording is currently in progress or resume a recording if a recording is currently paused. The voice memo application may support adjusting audio and/or recording volume in the same manner as the media playback application.

While a voice memo playback application is running, control interfaces 196, 197, and 198 (e.g., V−, center button, and V+) may be used in a similar manner as when the media playback application is running While an exercise application is running, control interface 197 (e.g., center button) may be used to initiate a voice feedback feature. In certain embodiment, the voice feedback feature includes voice commands and/or comments, beeps, tones, audio clips, video clips, alerts, ring tones, and/or any like audio-based indication that provides feedback, an indication, a communication, and/or notice for a user. In one embodiment, voice feedback includes a statement of distance traveled (e.g., "one mile") and/or a statement of distance remaining (e.g., "one mile to go"). In another embodiment, voice feedback includes statistical information or other status information (e.g., "heart rate is 128"). In further embodiment, the voice feedback feature may include a call, email, or other like communication notification (e.g., "call from Bill"). By pressing and holding the center button, a user may initiate a select media file such as a song (e.g., a powersong) that is desirable during an exercise routine or other activity. It should be understood that the control gestures and functions illustrated in Table 1 are exemplary of a broader range of possible control gestures, control operations, and applications that may utilize such control gestures.

A gesture may include one or more "touch events." In certain embodiments, a "touch event" is broader than just a touching of the input device and/or control interface. A touch event can be one of several touch events, including: a "touch begin" event (e.g., initial touch is detected), a "touch move" event (e.g., after initial touch is detected, the coordinates of the touch change), or a "touch end" event (e.g., after initial touch is detected, the touch is no longer detected). There may be other touch events as well (e.g., touch cancel). A gesture can be based on a series of touch events (e.g., touch down+ multiple touch moved+ touch up events), or a gesture may be interpreted as its own "gesture event" that includes scale and/or rotation information. In one embodiment, the foregoing touch events are applied to a touch surface. In other embodiments, the touch events correspond to button press events, which may include, without limitation, a press down event, a press down duration event, and a press up event.

By including control interfaces 196, 197, and 198 in the audio communications device 190, a media device user can advantageously control certain functions of their media device via a relatively small form-factor interface without the need to handle or interface directly with the media device itself. Thus, in certain circumstances, a user can secure their media device in a pocket, a purse, or to a belt, while retaining control of the media device via the PCU 194.

In certain embodiments, the PCU 194 includes a single-handed user interface for enabling a user to hold the PCU 194 and input control gestures. The PCU 194 may also include a communications interface for sending control information to the media device in response to the inputted control gestures where the control information is used to control an operation of the media device. The term "hold" should be understood to include grasp, support, and/or position. The term "hold" is not limited to independent support of the PCU 194. For example, a PCU 194 may be supported by some other mechanism such as a wire when the PCU 194 is tethered to a headset. Thus, a user may hold the PCU 194 while some other mechanism also holds the PCU 194. Alternatively, a user may independently hold the PCU 194. A single-handed interface includes an interface where a user can interact with a device using one hand.

The single-handed user interface may include a plurality of control interfaces. A control interface may include a button, click wheel, touch pad, switch, and/or presence sensor. A presence sensor may include a magnetic, light, capacitive, touch, or like sensor. A user may input the control gestures by actuating the plurality of control interfaces, a portion of which either concurrently or sequentially, using at least one finger of the user's hand. The PCU 194 may be tethered to a media device and include a wired communications interface. The PCU 194 may be un-tethered from a media device and include a wireless communications interface to facilitate communications with the media device. The PCU 194 may include a form factor that enables a user to hold the peripheral control unit between at least one finger and thumb of the user's hand.

The PCU 194 may be a stand-along unit or may be integrated with another device or structure. For example, the PCU 194 may be included with a media headset such as the audio communications device 190. The PCU 194 may be integrated with eye glasses, a stereo, radio receiver, clothing, a vehicle, helmet, watch, a wearable electronic device, and the like. The PCU 194 may be removably attachable to another device.

Figure 7:
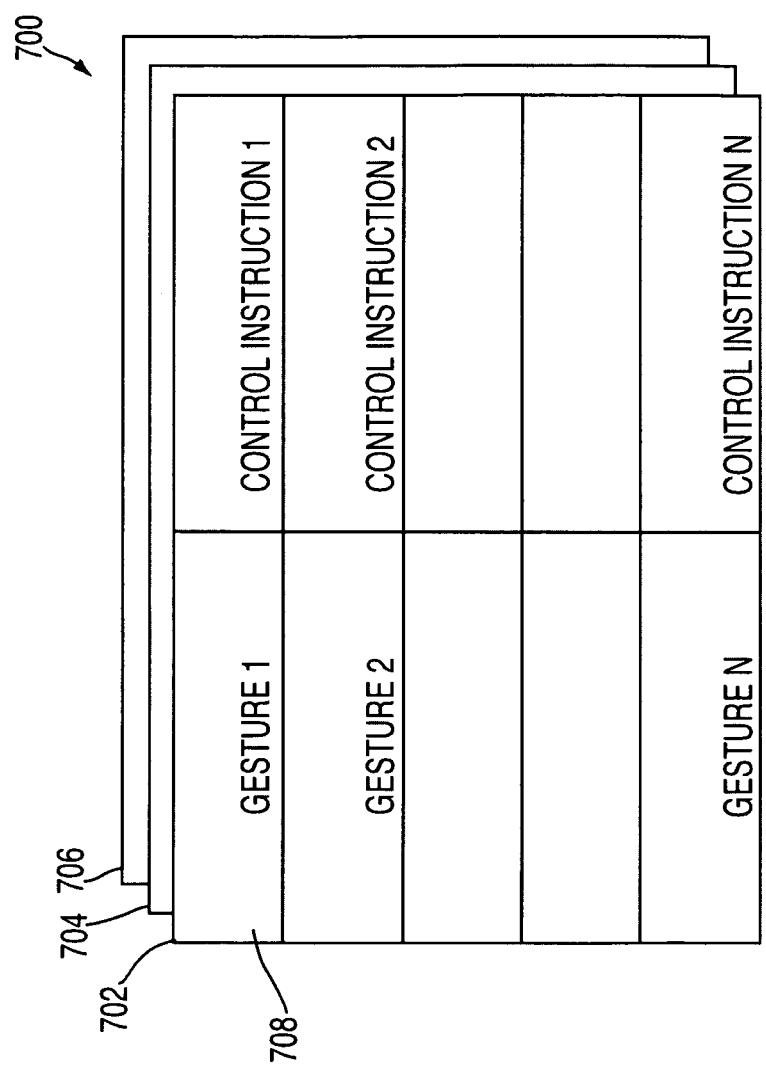
FIG. 7 includes a database and/or list associating user headset control unit gestures with media device control instructions according to an illustrative embodiment of the invention.

FIG. 7 includes a database 700 and/or list associating control signals derived from user control gestures, generated via the control interfaces 196, 197, and 198 of the PCU 194, with media device control instructions according to an illustrative embodiment of the invention. The database 700 may include multiple lists 702, 704, and 706 of control gestures and associated control instructions 708 where each list is associated with a particular application of a media device such as media device 103 or 500. For example, list 702 may be associated with a media playback application while lists 704 and 706 are associated with a radio application and voice memo application respectively.

Figure 8:
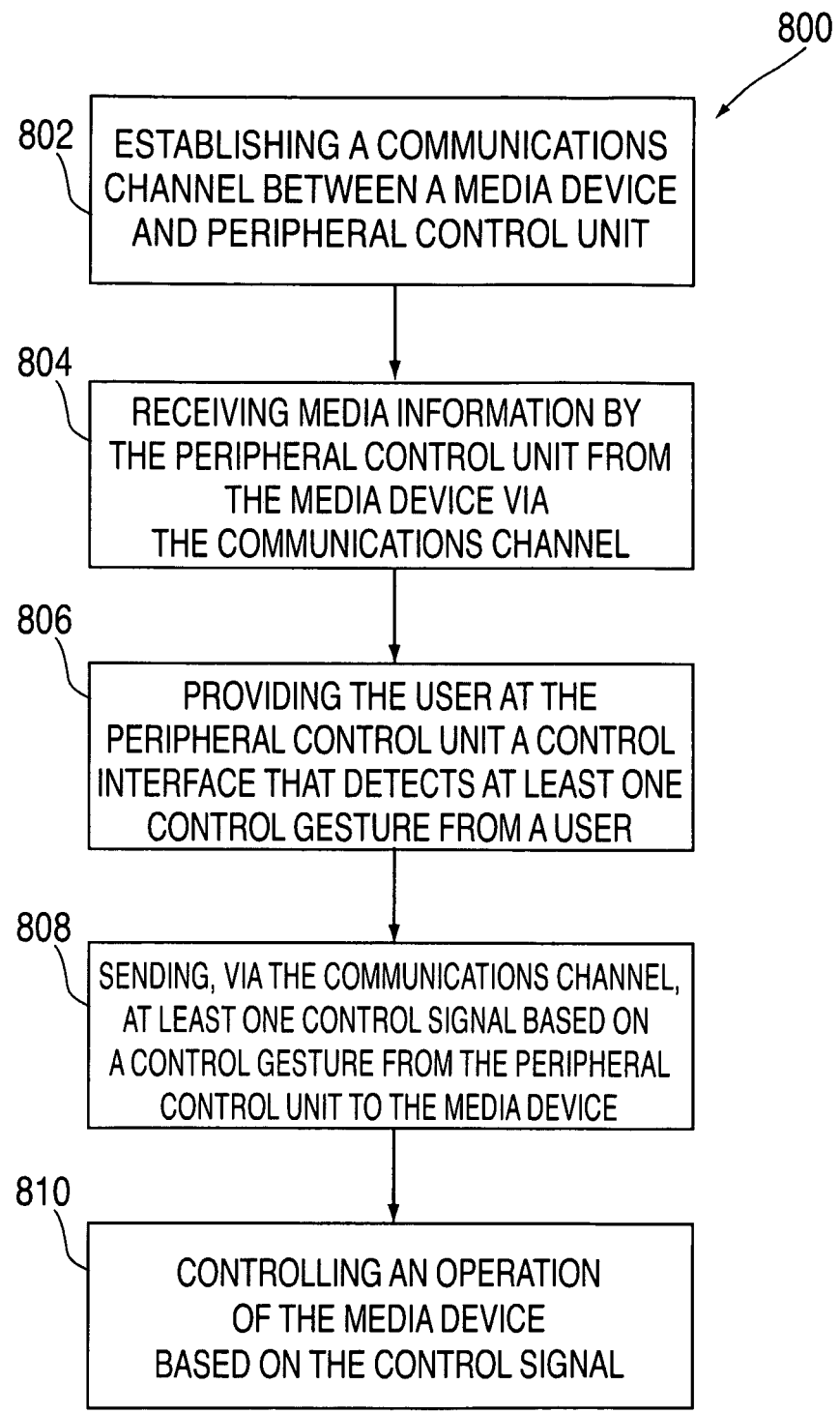
FIG. 8 is a flow diagram of a process for controlling a media device via a peripheral control unit according to an illustrative embodiment of the invention.

FIG. 8 is a flow diagram of a process 800 for controlling a media device via a peripheral control unit according to an illustrative embodiment of the invention. First, a communications channel 105 is established between a media device 103 and a peripheral control unit 194 of an audio communications device 190 (Step 802). Then, the PCU 194 receives media information from the media device 103 via the communications channel 105 (Step 804). Media information may include, without limitation, signal information for playing audio via speakers 191 and 192. Media information may include, without limitation, signal information associated with audio files, songs, video, multimedia, and the like. The PCU 194 provides the user with a control interface including control interfaces 196, 197, and/or 198 so that the control interface can detect one or more control gestures made by the user (Step 806). The PCU 194 may send at least one control signal based on a control gesture by a user to the media device 103 via the communications channel 105 (Step 808). Once the control signal is received, the media device 103 may control an operation and/or function based on the control signal (Step 810).

Figure 9:
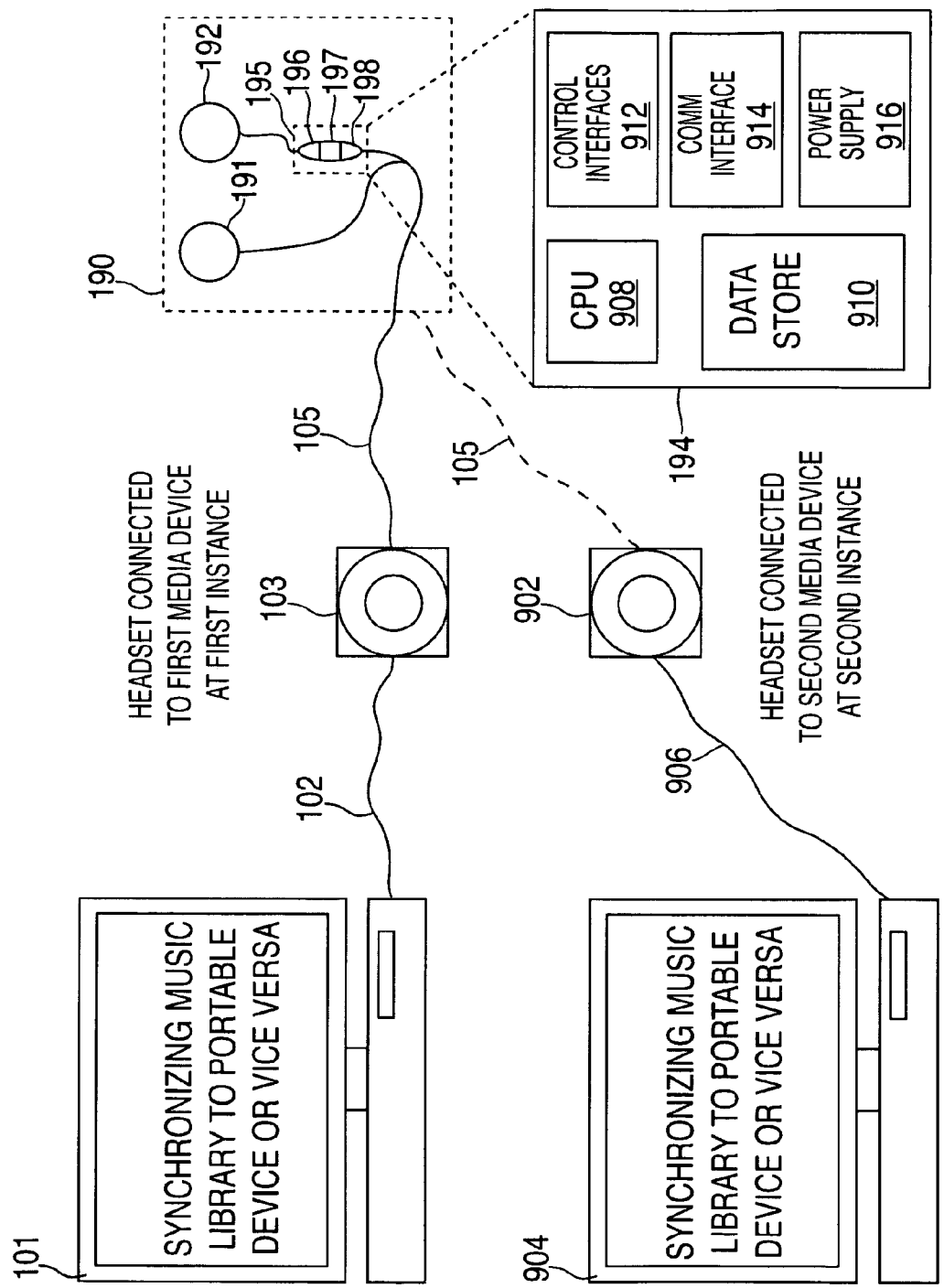
FIG. 9 is a communications topology where a headset is connected to a first media device at a first instance and then connected to a second media device at a second instance according to an illustrative embodiment of the invention.

FIG. 9 is a communications topology where a headset, e.g., audio communications device 90, is connected to a first media device 103 at a first instance and then connected to a second media device 902 at a second instance according to an illustrative embodiment of the invention.

As discussed with respect to FIG. 1, FIG. 9 shows a computer 101, media device 103, and audio communications device 190. Media device 103 may communicate with computer 101 via communications channel 102. At a first instance and/or time, media device 103 may communicate with audio communications device 190 via communications channel 105. In one embodiment, communications channel 105 is a wired communication channel. The communications channel 105 may include a data cable that is integrated with or a part of the audio communications device 190. Similarly, media device 902 may communicate with computer 904 via communications channel 906. At a second instance and/or time, media device 902 may communicate with audio communications device 190 via communications channel 105.

In certain embodiments, the PCU 194 of the audio communications device 190 includes a data store 910 capable of storing electronic information and/or data. The data store 910 may include a volatile and/or non-volatile memory. The data store 910 may include at least one of a hard disk drive, a flash memory, a memory chip, a computer readable and/or writable memory, and the like. The capacity of the data store 910 may vary depending on the type of data store, available space in the PCU 194, and/or the type of data stored. For example, if the data store 910 is only required to store user preference information, the data store 910 capacity may be less than or equal to about 2, 4, 8, 16, 32, 64, 256, 512, and 1024 Kbytes. If the data store 910 is configured to enable the transfer and/or storage of large amounts of data (e.g., songs, video, multimedia), then the data store 910 may include a flash drive having a capacity of greater than or equal to 2 Mbytes, 4 Mbytes, 8 Mbytes, 16 Mbytes, 32 Mbytes, 64 Mbytes, 128 Mbytes, 512 Mbytes, 1 Gbytes, 2 Gbytes, 4 Gbytes, 8 Gbytes, 16 Gbytes, 32 Gbytes, and 64 Gbytes. The data store 910 may include a hard disk drive or other non-volatile memory that supports the same or even larger data storage capacity as a flash drive.

The PCU 194 may include a controller and/or processor 908, control interfaces 912, a communications interface 914, and/or a power supply 916. The processor 908 may control the exchange of data to and/or from the data store 910. The processor 908 may also control one or more operations associated with the control interfaces 912, the communications interface 914, and the power supply 916. The control interfaces 912 may include control interfaces 196, 197, and 198 as discussed with respect to FIG. 1. The processor 908 may support any number of functions and/or operations such as digital right management, security operations, media device authentication and authorization, and/or data exchange between the data store 910 and a media device. In certain embodiments, the device 190 includes a computer architecture having one or more elements as described with respect to FIG. 6.

The communications interface 914 may include any one of a number of communications circuit elements that enable communications between the device 190 and a media device, e.g., media device 103. In one embodiment, the interface 914 includes circuitry and communications processes as described with respect to FIGS. 2, 3A, and 3B. In other embodiments, the interface 914 supports any number of digital and/or analog communications protocols and mechanisms that facilitate communications with the device 190. In certain embodiments, data communications are supported via one or more of the ground, microphone, left audio, and right audio channels of the communications channel 105. The communications channel 105 may have other channels such as, without limitation, a power channel and one or more data channels that enable additional data bandwidth. The communications interface 914 may support, without limitation, time-division multiplexing, frequency-division multiplexing, and/or code division multiplexing. In one embodiment, the communications interface 914 includes an audio driver circuit to provide left and right audio signals to speakers 191 and 192 respectively. The communications interface 914 and communications channel 105 may be collectively referred to as a communications interface of the device 190. A connector of device 190 may include a male connector such as, without limitation, the male plug of FIG. 1.

The power supply 916 may include a battery such as, without limitation, a lithium-based re-chargeable battery. The battery may be removable and/or replaceable. The power supply 916 may include a photo voltaic cell, fuel cell, an interface to a power input line, and/or an electro-chemical element. In one embodiment, the audio communications device 190 is capable of autonomous operation from any media device such that the device 190 is capable of playing one or more songs, video files, and/or audio files that are stored in the data store 910 using the communication interface 914 to drive the speakers 191 and 192.

One advantage of including a data store 910 is that the audio communications device 190 has the capability to store certain data associated with or for a connected media device. In one embodiment, the audio communications device 190 stores configuration information associated with a user of the audio communications device 190. The information may include user-specific configuration settings for a connected media device. Thus, a user can attach the audio communications device 190 to any media device, e.g., media device 103, and efficiently or automatically configure the attached media device 103 based on the user-specific configuration settings from the data store 910. For example, the user-specific configuration settings may include equalizer settings to configure the speaker output signals while the media device 103 is playing music. The same equalizer settings may be used by the audio communications device 190 to configure the audio equalization of other connected media devices, such as media device 902. Thus, regardless of which media device a user plugs the headset 190 into, the media device can adjust its equalizer settings based on the user's preferences stored in the data store 910 of the headset 190. In certain embodiments, the equalizer configuration data and/or other data is communicated over the communications channel 105, e.g., a microphone line, using transmitter 222 of FIG. 3A in the form of one or more high frequency tones and/or signals.

The media device 902 and/or audio communications device 190 may utilize one or more detection mechanisms to determine when the devices 902 and 190 are connected via the communications channel 105. For example, a handshake, polling, auto-detection, data flag, interrupt, and/or like mechanism may be employed to enable the device 902 and device 190 to establish a communications link via the communications channel 105. One form of handshaking mechanism is described in U.S. Patent Application No. 60/934,733, filed on Jun. 15, 2007, entitled "Systems and Methods for Providing Device-to-Device Handshaking Through a Power Supply Line," whose priority is claimed by U.S. patent application Ser. No. 12/157,912 filed Jun. 13, 2008 entitled "Systems and Methods for Providing Device-To-Device Handshaking Through a Power Supply Signal (now U.S. Pat. No. 8,332,664 issued Dec. 11, 2012), the entire contents of which are incorporated herein by reference.

The data store 910 may store media device data that includes, without limitation, media data and media device configuration data. The media device configuration data may include user-specific configuration settings such as, without limitation, user interface settings, video display settings, keypad mapping settings, configuration settings for a media device software application, alert settings for a media device (e.g., ringtones), communications settings, authentication information, access control information, encryption/decryption information, and/or digital rights management information. Media data may include music, song, video, image, multimedia, game, audio file, audio recording, video file, video recording, a contact list, a software application, personal information, business information, v-card information, medical information, financial information, metadata, any type of electronic data, any type of digital media, and the like.

Another advantage of including a data store 910 in the audio communication device 190 is that the audio communications device 190 can function as a data transfer medium between media devices such as first and second media devices 103 and 902. Because the media device 103 may synchronize with the PC 101 and the media device 902 may synchronize with the PC 906, the audio communications device 190 can also advantageously act as an intermediary to enable the transfer of data between PC 101 and PC 904.

Figure 10:
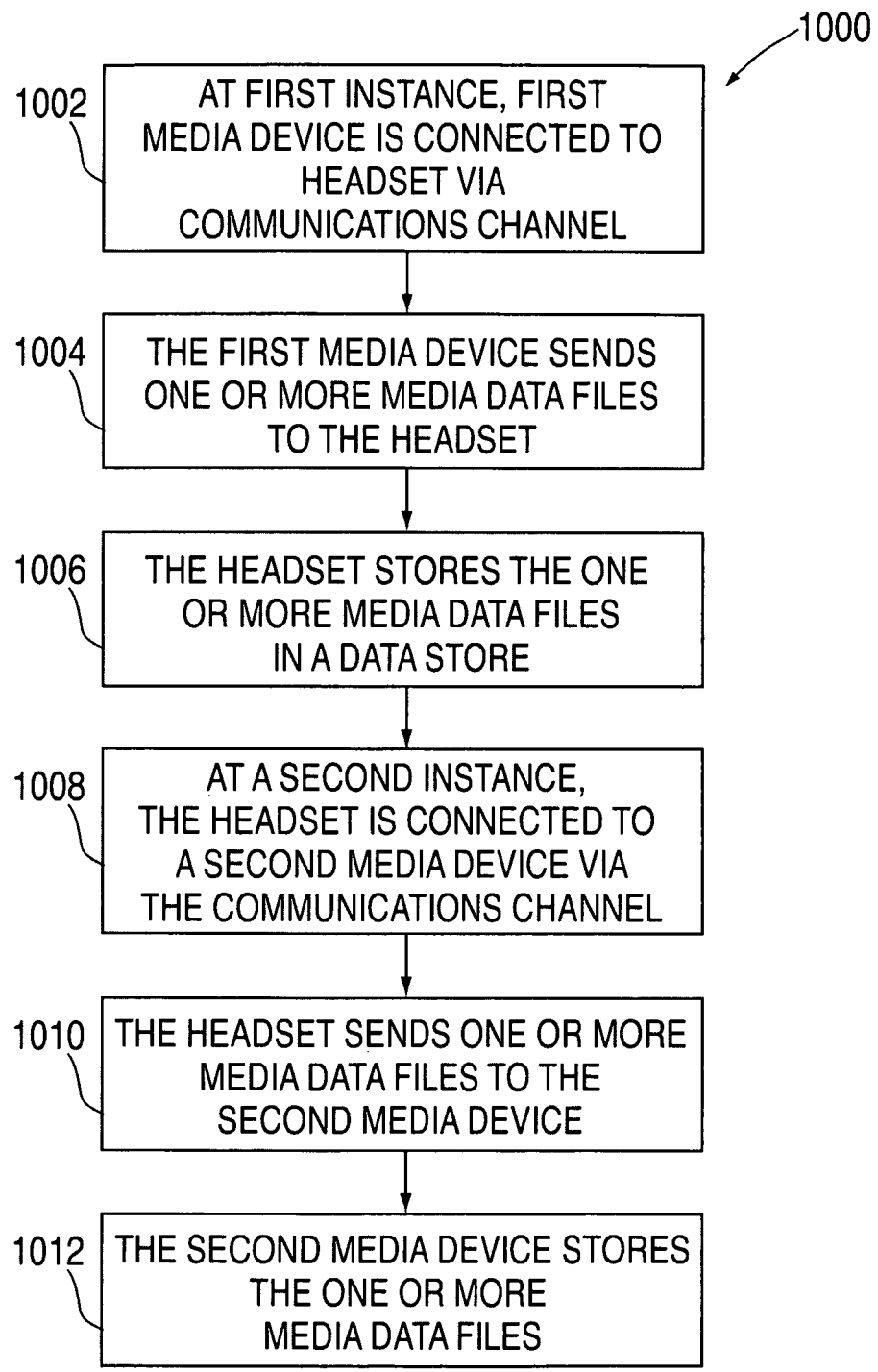
FIG. 10 is a flow diagram of a process for transferring data from a first media device to a second media device using a headset with a data store according to an illustrative embodiment of the invention.

FIG. 10 is a flow diagram of a process 1000 for transferring data from a first media device 103 to a second media device 902 using a headset, e.g., audio communications device 190, with a data store 910 according to an illustrative embodiment of the invention. At a first instance, the headset 190 is connected to the media device 103 via communications channel 105 (Step 1002). The media device 103 and headset 190 may then perform a handshake operation. At least one of the device 103 and headset 190 may authenticate the other device to determine whether communications between the device 103 and headset 190 are authorized. At least one of the device 103 and headset 190 may determine the capabilities of the other device to identify whether certain features of the other device are configurable. In one embodiment, the device 103 and headset 190 negotiate to determine the configuration of at least one of the devices.

Then, the media device 103 sends one or more media device data files to the headset 190 (Step 1004). The headset 190, in turn, stores the one or more media device data files in the data store 910 (Step 1006). In one embodiment, the media device 103 receives the one or more media device data files from the PC 101 prior to sending the media device data files to the headset 190. The controller 908 may interface with a controller of the media device 103 to facilitate the data transfer to the data store 910. The user of the headset 190 then disconnects the headset 190 from the media device 103. The headset 190 may remain disconnected for a period of time from any media device. In certain embodiments, the headset 190 is capable of 'autonomous operation where the headset 190 can access the one or more media data files and, for example, play music via the speakers 191 and 192. The headset may store the one or more media device data files for a period of time. The headset may be physically transported from one location to another location by a user.

At a second instance, the headset is connected to media device 902 via the communications channel 105 (Step 1008). The media device 902 and headset 190 may then perform a handshake operation. At least one of the device 902 and headset 190 may authenticate the other device to determine whether communications between the device 902 and headset 190 are authorized. At least one of the device 902 and headset 190 may determine the capabilities of the other device to identify whether certain features of the other device are configurable. In one embodiment, the device 902 and headset 190 negotiate to determine the configuration of at least one of the devices.

Then, the headset 190 sends one or more media device data files to the media device 902 (Step 1010). The media device 902, in turn, stores the one or more media device data files in its memory (Step 1012). The controller 908 may interface with a controller of the media device 902 to facilitate the data transfer from the data store 910. The user of the headset 190 and now media device 902 may then perform certain operations of the media device 902 such as, for example, play one or more songs or audio files. In one embodiment, the media device 902 may be connected to the PC 904 to enable synchronization and/or transfer of the one or more media device data files from the media device 902 to the PC 904. Thus, the headset 190 can enable the transfer of data from the PC 101 to the PC 904 by functioning as an intermediary data storage and transport medium between the media device 103 and the media device 902.

In various embodiments, the headset 190 may support digital rights management (DRM) operations to control the distribution of media device data to and from the data store 910. In one embodiment, the processor 908 performs operations such as, without limitation, record the transfer of particular media device data to or from the data store 910, record and/or identify the origin of a certain media device data (e.g., a particular song), send certain recorded data to a remote server (e.g., iTunes® server), and/or record types of media transfer to or from the data store 910. The recorded data may include the types of songs or videos transferred to and from the data store 910, the number of times that a particular media device data is used and/or played, the amount of particular types of media device data transferred to or from the data store 910, and the like. Certain media data may include metadata such as, for example, digital rights information. In one embodiment, the processor 908 performs an operation on a particular media data item based on its associated digital rights metadata. In certain embodiments, the processor 908 restricts the usage of certain media data based on digital rights rules. For example, a song or video may only be transferred to or from the data store 910 a defined number of times, at certain times, during a limited period of time, or before an expiration date.

The headset 190 may use at least one of a number of secure media distribution mechanisms or standards. The headset 190 may employ a public and/or proprietary DRM system or content protection technology. The DRM technology may include, without limitation, at least one of the Digital Transmission Content Protection (DTCP) standard, the Advanced Access Content System (AACS), Content Scrambling System (CSS), Content Protection for Prerecorded Media (CPPM), DeCSS, Windows DRM (WDRM), Protected Media Path, Protected Video Path (PVP), Blu-ray, OZAuthors, and any like DRM mechanism.

Content protection technologies typically use technical and legal mechanisms to protect digital content against unauthorized use. The technical mechanisms may involve cryptographic techniques for securing the digital content, rights thereto, and content distribution. They may also involve the use of DRM technologies for protecting the rights and interests in distributing or accessing the digital content. "Rights" may include, for example, the right to view the digital content unit, the right to make copies of the digital content unit, the right to redistribute the digital content unit, to publicly display the digital content unit, to modify or sample the digital content unit, to create derivative works of the digital content unit, and so forth.

Rights as used herein may include one or more rights common under United States and foreign copyright law. Further, such rights may be restricted or unlimited. As yet another example, a right may be restricted as to the location in which the right may be exercised, the number of times the right may be exercised, to a particular timeframe in which the right may be exercised, the way in which the right may be exercised, and so on.

An example of a common content protection technology relying on cryptographic techniques to protect digital content includes the CPPM technology for protecting digital content stored on prerecorded digital versatile disks (DVD). CPPM selectively encrypts disc sectors that can only be decrypted during playback by licensed products, such as DVD players. Critical information, e.g., decryption keys, required to unlock the digital content stored in the prerecorded DVDs is located in protected regions of the discs accessible only to the licensed products and under carefully regulated circumstances. Without these keys the encrypted digital content is unusable. Performing bit-for-bit duplication or simply copying files from the protected DVD to a writable DVD, hard drive or other storage medium is prohibited unless the DVD's key is known. Writable DVD products employ several safety safeguards to prevent valid decryption keys from ever being written to these discs. In addition, software for watching DVDs is generally "trusted," such that it does not allow a user to watch an unauthorized copy of a DVD (i.e. one lacking the decryption key).

Additional examples of common content protection technologies relying on cryptographic techniques include the "Fairplay" scheme used by digital content stores, such as the iTunes® Store. Digital content stores may use a hybrid of secret key and public key cryptographic techniques to protect their digital content, or may employ multiple keys. They may also use hash techniques in combination with, say, a hybrid secret key/public key technique.

For example, in the Fairplay system, two keys are used to protect a digital content unit. When a user obtains a digital file from the iTunes® Store (possibly through purchase), the user downloads an encrypted audio file that has been encrypted with a random key. The random key is stored in a header of the digital content unit. This header is encrypted with an encryption key specifically linked to the user. Thus, the user's key may be used to decrypt the header of the digital content unit and retrieve the random key, which may then decrypt the remainder of the digital content unit. In this manner, each digital content unit is randomly encoded throughout the majority of its length with a different random key. This makes it difficult for a third party who obtains copies of multiple digital content units associated with a single, legitimate user to guess or derive that legitimate user's personal key. This, in turn, may reduce the unauthorized copying and/or distribution of digital content units.

Persons skilled in the art will appreciate that the various configurations described herein may be combined without departing from the present invention. It will also be recognized that the invention may take many forms other than those disclosed in this specification. Accordingly, it is emphasized that the invention is not limited to the disclosed methods, systems and apparatuses, but is intended to include variations to and modifications thereof which are within the spirit of the following claims.

What is claimed is:

1. A headset configured to communicate with a media device, comprising:
   a peripheral control unit, comprising:
   a data store configured to store a user configuration;
   a processor coupled at least to the data store that supports a data exchange between the data store and the media device, wherein when the peripheral control unit is in communication with the media device, the processor causes the data store to send the user configuration directly to the media device that the media device uses to adjust a corresponding operating parameter;
   a wired communications channel having a first end and a second end, wherein an audio plug is connected to the first end and a first audio speaker is connected to the second end;
   wherein the peripheral control unit is positioned on a central portion of the wired communications channel;
   wherein the second end of the wired communications channel is coupled to a first channel and a second channel;
   wherein the first audio speaker and the peripheral control unit are positioned on the first channel; and
   wherein the second channel includes a second audio speaker.

2. The headset as recited in claim 1, wherein the peripheral control unit is enclosed such that the peripheral control unit is free of connection ports capable of electrically connecting to an external device.

3. The headset as recited in claim 2, wherein the data store is capable of storing digital audio files and digital video files.

4. The headset as recited in claim 3, wherein the peripheral control unit includes an internal power supply and a communications interface.

5. The headset as recited in claim 4, wherein the peripheral control unit further includes a control interface.

6. The headset as recited in claim 1, wherein the media device is simultaneously connected to the headset and a first computer, the media device connected to the first computer via a second wired communications channel.

7. The headset as recited in claim 1, wherein the user configuration is sent from the data store to the media device when the headset is electronically connected to the media device.

8. The headset as recited in claim 1, wherein the user configuration automatically configures the media device when the headset is electronically connected to the media device.

9. The headset as recited in claim 7, wherein the user configuration includes an equalizer setting used by the headset to configure an audio output to a speaker of the headset.

10. The headset as recited in claim 7, wherein the user configuration is sent from the data store to a second media device when the headset is electronically connected to the second media device.

11. The headset as recited in claim 10, wherein the user configuration adjusts the second media device in a similar configuration as the user configuration adjusts the media device.

12. A method of changing a user setting on a headset, comprising:
    performing a first adjustment to a media device using a control interface of the headset to form a first user setting, the headset directly connected to the media device;
    sending the first user setting to a data store of the media device;
    performing a second adjustment to the media device using the control interface of the headset to form a second user setting different from the first user setting, the second adjustment subsequent to the first adjustment; and
    sending the second user setting to the data store of the media device;
    wherein the data store overwrites the first user setting with the second user setting;
    wherein the first adjustment and the second adjustment are capable of an adjustment to an equalizer setting;
    wherein the control interface is positioned at least partially within a peripheral control unit; and
    wherein the peripheral control unit is located on a central portion of the headset.

13. The method as recited in claim 12, further comprising, prior to performing the first adjustment, establishing an authentication between the headset and the media device.

14. The method as recited in claim 13, wherein the establishing an authentication includes sending identification information from the headset to the media device.

15. The method as recited in claim 14, wherein identification information includes a password, authentication data, or a cryptographic response.

16. The method as recited in claim 13, wherein communication between the headset and the media device is termination when the headset does not send the appropriate identification information.

17. The method as recited in claim 12, wherein the data store and the control interface are positioned within a peripheral control unit.

18. The method as recited in claim 17, wherein the peripheral control unit includes a first channel extending from a first end of the peripheral control unit and a second channel extending from a second end of the peripheral control unit, and wherein the peripheral control unit is free of an electrical connection mechanism on an outer peripheral portion of the peripheral control unit between the first end and the second end.

19. A method of configuring a second media device using a first media device, comprising:
    creating a user configuration using a control of the first media device;
    sending the user configuration directly to a headset via a communications interface of the headset;
    storing the user configuration on a data store of the headset;
    sending the user configuration from the data store of the headset directly to the second media device via the communications interface;
    adjusting the second media device using the user configuration,
    wherein adjusting the second media device includes changing a setting in the second media device;
    wherein the setting is capable of adjusting an equalizer setting; and
    wherein the user configuration includes a user interface setting and a video display setting.

20. The method as recited in claim 19, wherein the user configuration includes a keypad mapping setting.

21. The method as recited in claim 19, wherein the user configuration includes a configuration setting for a media device software application.

22. The method as recited in claim 19, wherein the headset receives an authentication setting from the first media device prior to the headset communicating with the first media device.

23. The method as recited in claim 22, wherein the headset receives an authentication setting from the second media device prior to the headset communicating with the second media device.

24. The method as recited in claim 23, wherein the authentication setting is selected from a password or a cryptographic response.

25. A method of configuring a second media device by way of a first media device, comprising:
    creating a user configuration on the first media device using a control interface of a headset;
    sending the user configuration from the first media device to the headset, wherein the user configuration is retained in a data store coupled to the control interface;
    sending the user configuration from the data store via a communications interface of the headset to the second media device;
    adjusting the second media device using the user configuration;
    wherein the control interface, the data store, the communications interface are positioned with a peripheral control unit in line with a communications channel of the headset, and the data store is capable of storing the user configuration and an audio file;
    wherein the data store, the control interface, and the communications interface are capable of electrically communicating to an external device only through an audio plug on the headset; and
    wherein the peripheral control unit includes a processor, the processor capable of processing digital right management, security operations, and authentication with the first media device and the second media device.

26. The method as recited in claim 25, wherein the peripheral control unit further includes a microphone.

27. The method as recited in claim 25, wherein the data store includes memory positioned completely within a peripheral control unit.

28. The method as recited in claim 25, wherein adjusting the second media device includes adding a digital video file to the second media device, the digital video file stored on the data store.

29. The method as recited in claim 25, wherein adjusting the second media device includes adjusting an equalizer setting the second media device, the equalizer setting stored on the data store.

* * * * *